United States Patent
Morinaga et al.

(10) Patent No.: US 12,306,503 B2
(45) Date of Patent: May 20, 2025

(54) LIQUID CRYSTAL DISPLAY DEVICE COMPRISING ELECTRODES EACH HAVING A PLURALITY OF SLITS THAT FORM AN ACUTE ANGLE WITH A SHORT SIDE OF THE ELECTRODES

(71) Applicant: Sharp Display Technology Corporation, Kameyama (JP)

(72) Inventors: Junichi Morinaga, Kameyama (JP); Hiroyuki Ohgami, Kameyama (JP); Hikaru Yoshino, Kameyama (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 18/614,489

(22) Filed: Mar. 22, 2024

(65) Prior Publication Data
US 2024/0393646 A1    Nov. 28, 2024

(30) Foreign Application Priority Data
May 25, 2023   (JP) .................. 2023-086487

(51) Int. Cl.
*G02F 1/1343* (2006.01)
*G02F 1/1337* (2006.01)
*G02F 1/1362* (2006.01)

(52) U.S. Cl.
CPC .......... *G02F 1/134372* (2021.01); *G02F 1/133707* (2013.01); *G02F 1/136286* (2013.01)

(58) Field of Classification Search
CPC ............ G02F 1/1343; G02F 1/133776; G02F 1/133757
See application file for complete search history.

(56) References Cited

U.S. PATENT DOCUMENTS

| | | | | |
|---|---|---|---|---|
| 6,297,867 | B1* | 10/2001 | Miyahara | G02F 1/1345 349/141 |
| 2003/0043327 | A1* | 3/2003 | Aoyama | G02F 1/134363 349/141 |
| 2005/0225708 | A1* | 10/2005 | Oke | G09G 3/3607 349/139 |
| 2009/0046234 | A1* | 2/2009 | Tanaka | G02F 1/134363 349/141 |

(Continued)

FOREIGN PATENT DOCUMENTS

JP    2010-107595 A    5/2010

*Primary Examiner* — Paul C Lee
(74) *Attorney, Agent, or Firm* — ScienBiziP, P.C.

(57) ABSTRACT

A liquid crystal display device includes source wiring lines, and first electrode and second electrode configured to generate a fringe electrical field. The first electrode includes slits. Each slit forms an acute angle with pixel short-hand direction defined in row direction smaller than an acute angle formed by each slit and pixel longitudinal direction defined in column direction. The slits include first slits each extending an acute angle in a clockwise direction with respect to the pixel short-hand direction, and second slits each extending an acute angle in a counterclockwise direction with respect to the pixel short-hand direction. The first electrode includes first region in which the first slits are formed, and second region in which the second slits are formed. In a plan view, each source wiring line is bent at a position corresponding to a boundary between the first region and the second region.

14 Claims, 27 Drawing Sheets

(56) References Cited

U.S. PATENT DOCUMENTS

| | | | | |
|---|---|---|---|---|
| 2010/0103360 A1* | 4/2010 | Shimomaki | ....... | G02F 1/134363 |
| | | | | 349/141 |
| 2012/0127409 A1* | 5/2012 | Imayama | .......... | G02F 1/134363 |
| | | | | 349/133 |
| 2019/0033636 A1* | 1/2019 | Morinaga | ........... | H01L 27/1248 |
| 2019/0317375 A1* | 10/2019 | Morinaga | ......... | G02F 1/136286 |

* cited by examiner

LIQUID CRYSTAL DISPLAY DEVICE COMPRISING ELECTRODES EACH HAVING A PLURALITY OF SLITS THAT FORM AN ACUTE ANGLE WITH A SHORT SIDE OF THE ELECTRODES

CROSS-REFERENCE TO RELATED APPLICATIONS

This application claims the benefit of priority to Japanese Patent Application Number 2023-086487 filed on May 25, 2023. The entire contents of the above-identified application are hereby incorporated by reference.

BACKGROUND

Technical Field

The disclosure relates to a liquid crystal display device, and particularly relates to a liquid crystal display device that perform display in an FFS mode.

In recent years, a fringe field switching (FFS) mode which is a type of transverse electrical field modes has often been adopted as a display mode for a small- and medium-sized liquid crystal display device used in a tablet, a laptop PC, and a smartphone. For example, JP 2010-107595 A discloses an FFS mode liquid crystal display device.

In the FFS mode liquid crystal display device, a pair of electrodes for generating a fringe electrical field is provided on an active matrix substrate. One of the pair of electrodes includes a plurality of slits and is disposed on the other electrode with an insulating layer interposed therebetween. When a voltage is applied between the pair of electrodes, the fringe electrical field is generated and an alignment regulating force of the fringe electrical field changes an alignment direction of liquid crystal molecules included in a liquid crystal layer. Hereinafter, among the pair of electrodes for generating the fringe electrical field, the electrode located on a relatively upper side, that is, a near side relative to the liquid crystal layer may be referred to as the "upper layer electrode", and the electrode located on a relatively lower side, that is, a far side relative to the liquid crystal layer may be referred to as the "lower layer electrode". As described above, the slits are formed at least in the upper layer electrode.

In this way, in the FFS mode liquid crystal display device, an alignment state of the liquid crystal molecules is controlled using the fringe electrical field. In the FFS mode, since the liquid crystal molecules rotate in a plane parallel to a display surface, high viewing angle characteristics are obtained.

In the FFS mode, a configuration in which, when a voltage is applied, two liquid crystal domains having different alignment directions are formed in each pixel (hereinafter referred to as "dual domain alignment") is often adopted to suppress a color change (coloring of display) when a viewing angle direction is changed. In an electrode structure for realizing the dual domain alignment, two types of slits extending in different directions are formed in the upper layer electrode.

JP 2010-107595 A discloses, as an electrode structure for realizing the dual domain alignment, a slit arrangement in which the two types of slits of an upper layer electrode extend so as to slightly incline with respect to a pixel longitudinal direction (a direction in which a source wiring line extends), and a slit arrangement in which the two types of slits extend so as to slightly incline with respect to a pixel short-hand direction (a direction in which a gate wiring line extends). Hereinafter, for convenience, the former slit arrangement is referred to as a "longitudinal arrangement" and the latter slit arrangement is referred to as a "transverse arrangement".

SUMMARY

In the transverse arrangement disclosed in JP 2010-107595 A, the source wiring lines extend along the pixel longitudinal direction in the vicinity of both ends of each slits extending so as to slightly incline with respect to the pixel short-hand direction. In such a configuration, by setting the distance from the source wiring line to the slit end or the distance from a black matrix to the slit end to be a certain distance or more, it is possible to suppress adverse effect on display caused by the potential of the source wiring line during a period in which a display signal is held in a pixel, a color mixing defect which means a mixed state of colors when seen diagonally, and the like.

However, in the transverse arrangement, setting the distance from the slit end to the source wiring line or to the black matrix to be a certain distance or more, as described above, may decrease a pixel aperture ratio.

Embodiments of the disclosure has been made in light of the above-described problems, and an object of the disclosure is to further increase the aperture ratio of an FFS mode liquid crystal display device.

The present specification discloses a liquid crystal display device according to the following items.

Item 1

A liquid crystal display device including:

an active matrix substrate;

a counter substrate facing the active matrix substrate;

a liquid crystal layer provided between the active matrix substrate and the counter substrate; and a plurality of pixels arranged in a matrix including a plurality of rows and a plurality of columns, in which the active matrix substrate includes, a substrate, a thin film transistor provided correspondingly to each of the plurality of pixels and supported by the substrate, a plurality of gate wiring lines each extending in a row direction, a plurality of source wiring lines each extending in a direction intersecting the row direction, an alignment film configured to determine an initial alignment direction, the initial alignment direction being an alignment direction of liquid crystal molecules when an electrical field is not applied to the liquid crystal layer, and a first electrode and a second electrode, both of which are configured to generate a fringe electrical field causing the liquid crystal molecules to align in a direction different from the initial alignment direction, the first electrode includes a plurality of slits and is provided on the second electrode with at least one insulating layer interposed between the first electrode and the second electrode, each of the plurality of pixels has a shape having a pixel short-hand direction defined in the row direction, and a pixel longitudinal direction defined in a column direction, each of the plurality of slits of the first electrode extends and forms an acute angle with the pixel short-hand direction smaller than an acute angle formed by each of the plurality of slits and the pixel longitudinal direction, the plurality of slits include
a plurality of first slits each extending and forming an acute angle in a clockwise direction with respect to the pixel short-hand direction, and
a plurality of second slits each extending and forming an acute angle in a counterclockwise direction with respect to the pixel short-hand direction,
the first electrode includes
a first region in which the plurality of first slits are formed, and
a second region in which the plurality of second slits are formed, the second region being adjacent to the first region along the pixel longitudinal direction, and
in a plan view, each of the plurality of source wiring lines is bent at a position corresponding to a boundary between the first region and the second region of the first electrode.

Item 2

The liquid crystal display device according to item 1,
in which the second electrode is a pixel electrode provided in each of the plurality of pixels and electrically connected to the thin film transistor, and
the first electrode is a common electrode to which a common voltage is applied.

Item 3

The liquid crystal display device according to item 2,
in which the common electrode includes a plurality of openings formed in regions located over the plurality of source wiring lines in a plan view.

Item 4

The liquid crystal display device according to item 3,
in which each of the plurality of openings is bent at a position corresponding to the boundary between the first region and the second region of the first electrode.

Item 5

The liquid crystal display device according to any one of items 2 to 4,
in which the thin film transistor includes a semiconductor layer, a gate electrode, a source electrode, and a drain electrode, and has a bottom gate structure in which the gate electrode is disposed between the substrate and the semiconductor layer,
the active matrix substrate further includes
a gate insulating layer formed to cover the gate electrode, and
an interlayer insulating layer formed to cover the thin film transistor,
the pixel electrode is provided between the substrate and the gate insulating layer, and
the at least one insulating layer located between the pixel electrode and the common electrode includes the gate insulating layer and the interlayer insulating layer.

Item 6

The liquid crystal display device according to item 5,
in which the gate insulating layer and the interlayer insulating layer include a pixel contact hole exposing a portion of the pixel electrode,
the active matrix substrate further includes a connection electrode, and the connection electrode and the common electrode are formed using the same transparent conductive film, and
the drain electrode of the thin film transistor and the pixel electrode are electrically connected to each other via the connection electrode at the pixel contact hole.

Item 7

The liquid crystal display device according to item 1,
in which the first electrode is a pixel electrode provided in each of the plurality of pixels and electrically connected to the thin film transistor, and
the second electrode is a common electrode to which a common voltage is applied.

Item 8

The liquid crystal display device according to item 7,
in which the active matrix substrate further includes a common wiring line extending in substantially parallel to the row direction, and
the common wiring line is electrically connected to the common electrode.

Item 9

The liquid crystal display device according to item 8,
in which the common wiring line and the plurality of gate wiring lines are formed using the same conductive film.

Item 10

The liquid crystal display device according to item 8 or 9,
in which the common wiring line is disposed at a position corresponding to the boundary between the first region and the second region of the first electrode.

Item 11

The liquid crystal display device according to any one of items 7 to 10,
in which the thin film transistor includes a semiconductor layer, a gate electrode, a source electrode, and a drain electrode, and has a bottom gate structure in which the gate electrode is disposed between the substrate and the semiconductor layer,
the active matrix substrate further includes
a gate insulating layer formed to cover the gate electrode, and
an interlayer insulating layer formed to cover the thin film transistor,
the common electrode is provided between the substrate and the gate insulating layer, and
the at least one insulating layer located between the pixel electrode and the common electrode includes the gate insulating layer and the interlayer insulating layer.

Item 12

The liquid crystal display device according to any one of items 1 to 11,
in which an outer edge of each of the plurality of slits includes a pair of long sides and a pair of short sides,
the pair of short sides are respectively located at both ends of each of the plurality of slits in the pixel short-hand direction,
each of the plurality of source wiring lines includes a first part adjacent to the first region of the first electrode, and
a second part adjacent to the second region of the first electrode,
the first part extends in a first direction inclined with respect to the column direction,
the second part extends in a second direction inclined with respect to the column direction and being different from the first direction,
each of the pair of short sides included in the outer edge of each of the plurality of first slits forms an angle of 5° or more and 30° or less with the first direction, and
each of the pair of short sides included in the outer edge of each of the plurality of second slits forms an angle of 5° or more and 30° or less with the second direction.

Item 13
The liquid crystal display device according to item 12, in which each of the plurality of slits is bent at or in a vicinity of the both ends of each of the plurality of slits.

Item 14
The liquid crystal display device according to any one of items 1 to 13, in which the initial alignment direction determined by the alignment film is substantially parallel to the row direction.

The embodiments of the disclosure can further increase the aperture ratio of an FFS mode liquid crystal display device.

BRIEF DESCRIPTION OF DRAWINGS

The disclosure will be described with reference to the accompanying drawings, wherein like numbers reference like elements.

FIG. 14 is a diagram for explaining the directions of a fringe electrical field FE generated by the pixel electrode PE and the common electrode CE, an electrical field E generated by the potential of a source wiring line 13, and a fringe electrical field FE' generated in the vicinity of the short side ss of the slit 15a.

DESCRIPTION OF EMBODIMENTS

Hereinafter, embodiments of the disclosure will be described with reference to the accompanying drawings. Note that the disclosure is not limited to the embodiments described below.

First Embodiment

Figure 1:
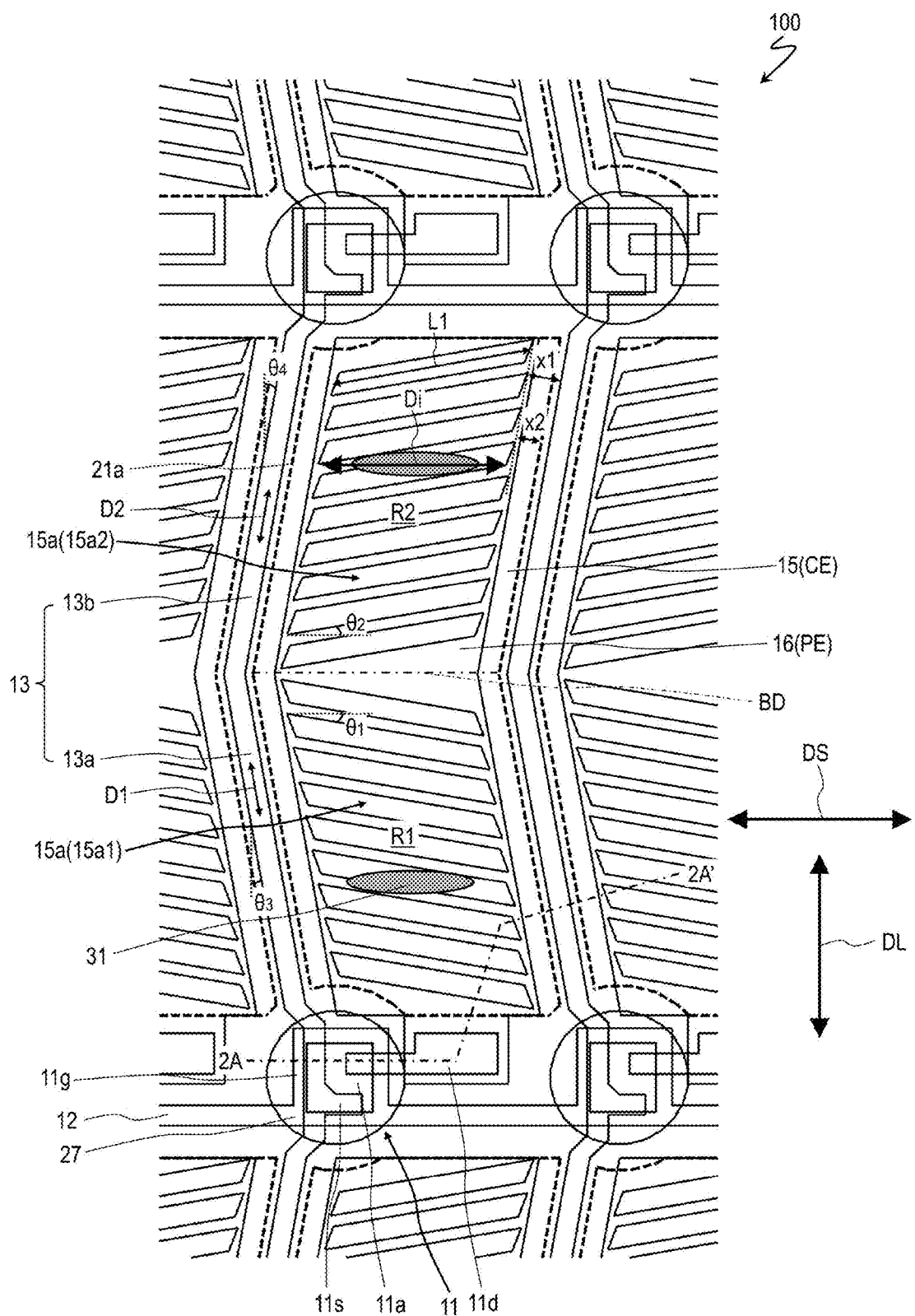
FIG. 1 is a plan view schematically illustrating a liquid crystal display device 100 according to an embodiment of the disclosure.
Figure 2:
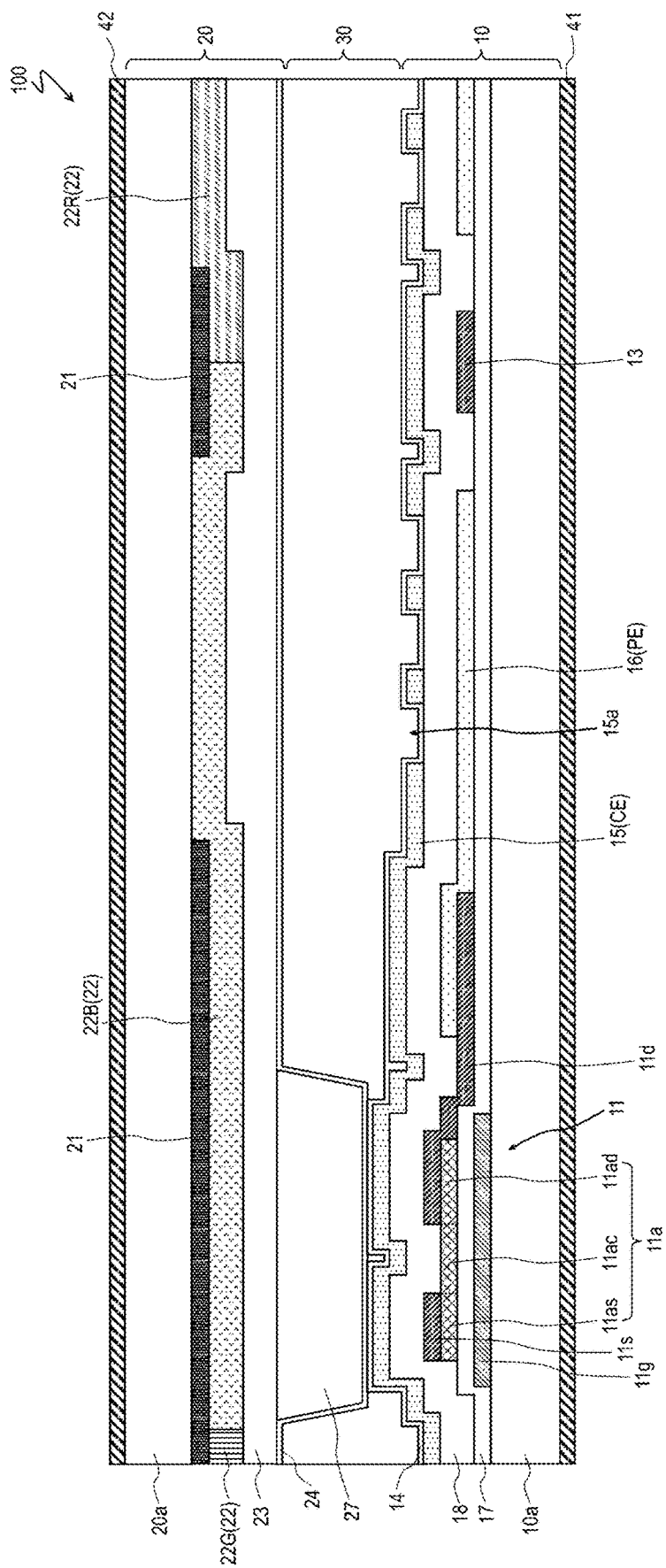
FIG. 2 is a cross-sectional view schematically illustrating the liquid crystal display device 100 and illustrates a cross section along the line 2A-2A' in FIG. 1.

A liquid crystal display device 100 according to the present embodiment will be described with reference to FIGS. 1 and 2. FIG. 1 is a plan view schematically illustrating the liquid crystal display device 100. FIG. 2 is a cross-sectional view schematically illustrating the liquid crystal display device 100 and illustrates a cross section along the line 2A-2A' in FIG. 1. Note that FIG. 1 illustrates a state in which no electrical field is applied to a liquid crystal layer 30.

As illustrated in FIG. 2, the liquid crystal display device 100 includes an active matrix substrate 10, a counter substrate 20 provided so as to face the active matrix substrate 10, and the liquid crystal layer 30 provided between the active matrix substrate 10 and the counter substrate 20. The liquid crystal display device 100 also includes a plurality of pixels arranged in a matrix including a plurality of rows and a plurality of columns. Each of the plurality of pixels has a shape having a pixel short-hand direction DS defined in the row direction (a horizontal direction in FIG. 1), and a pixel longitudinal direction DL defined in the column direction (a vertical direction in FIG. 1). The liquid crystal display device 100 further includes a pair of polarizers 41 and 42 that face each other with at least the liquid crystal layer 30 interposed therebetween, and performs displaying in the normally black mode.

In the present embodiment, the liquid crystal layer 30 is formed from a positive nematic liquid crystal material. In other words, liquid crystal molecules 31 included in the liquid crystal layer 30 have positive dielectric anisotropy. Note that the liquid crystal layer 30 may be formed from a negative nematic liquid crystal material. In other words, the liquid crystal molecules 31 may have negative dielectric anisotropy.

The active matrix substrate 10 includes a substrate 10a, thin film transistors (TFTs) 11 each provided correspondingly to one of a plurality of pixels, a plurality of gate wiring lines 12 each extending in the row direction, a plurality of source wiring lines 13 each extending so as to intersect the row direction, an alignment film 14 provided so as to be in contact with the liquid crystal layer 30, and a first electrode 15 and a second electrode 16 that can generate a fringe electrical field.

The substrate 10a is transparent and has insulating properties. The substrate 10a is, for example, a glass substrate or a plastic substrate.

The TFT 11 is supported by the substrate 10a. The TFT 11 includes a semiconductor layer 11a, a gate electrode 11g, a source electrode 11s, and a drain electrode 11d.

The gate electrode 11g is formed on the substrate 10a. A gate insulating layer 17 is formed so as to cover the gate electrode 11g, and the semiconductor layer 11a is formed on the gate insulating layer 17. The semiconductor layer 11a includes a channel region 11ac facing the gate electrode 11g with the gate insulating layer 17 interposed therebetween, and a source region 11as and a drain region 11ad that are positioned respectively on both sides of the channel region 11ac.

The source electrode 11s and the drain electrode 11d are formed on the semiconductor layer 11a and the gate insulating layer 17. The source electrode 11s is electrically connected to the source region 11as of the semiconductor layer 11a, and the drain electrode 11d is electrically connected to the drain region 11ad of the semiconductor layer 11a. In the illustrated example, a portion of a lower face of the source electrode 11s is in contact with an upper face of the source region 11as, and thus the source electrode 11s is electrically connected to the source region 11as. Likewise, a portion of a lower face of the drain electrode 11d is in contact with an upper face of the drain region 11ad, and thus the drain electrode 11d is electrically connected to the drain region 11ad.

In the illustrated TFT 11, the gate electrode 11g is disposed below the semiconductor layer 11a, i.e., between the substrate 10a and the semiconductor layer 11a. Thus, the TFT 11 has a bottom gate structure.

Each of the gate wiring lines 12 is electrically connected to the gate electrode 11g of the corresponding TFT 11 and supplies a gate signal (scanning signal) to the TFT 11. In the illustrated example, each of the gate wiring lines 12 and the gate electrode 11g of the corresponding TFT 11 are integrally formed.

Each of the source wiring lines 13 is electrically connected to the source electrode 11s of the corresponding TFT 11 and supplies a source signal (display signal) to the TFT 11. In the illustrated example, each of the source wiring lines 13 and the source electrode 11s of the corresponding TFT 11 are integrally formed.

The alignment film 14 determines an initial alignment direction Di which is an alignment direction of the liquid crystal molecules 31 when no electrical field is applied to the liquid crystal layer 30. As illustrated in FIG. 1, when the liquid crystal layer 30 is formed of a positive nematic liquid crystal material, the initial alignment direction Di is substantially parallel to the row direction (that is, directions of the major axes of the liquid crystal molecules 31 are substantially the same as the direction in which the gate wiring lines 12 extend). The alignment film 14 mainly serves as a horizontal alignment film that determines the alignment direction of the liquid crystal molecules 31. In another example in which the liquid crystal layer 30 is formed of a negative nematic liquid crystal material, the initial alignment direction Di is substantially parallel to the column direction (that is, directions of the major axes of the liquid crystal molecules 31 are substantially the same as the direction in which the source wiring lines 13 extend).

The fringe electrical field generated by the first electrode 15 and the second electrode 16 aligns the liquid crystal molecules 31 in a direction different from the initial alignment direction Di. One of the first electrode 15 and the second electrode 16 is a pixel electrode PE, and the other of the first electrode 15 and the second electrode 16 is a common electrode CE. In the present embodiment, the first electrode 15 is the common electrode CE, and the second electrode 16 is the pixel electrode PE.

The pixel electrode PE (the second electrode 16) is provided in each of the plurality of pixels, and electrically connected to the TFT 11 (more specifically, to the drain electrode 11d of the TFT 11). In the illustrated example, the pixel electrode PE is formed on the gate insulating layer 17 and the drain electrode 11d. A portion of the lower face of the pixel electrode PE is in contact with the upper face of the drain electrode 11d, and thus the pixel electrode PE is electrically connected with the drain electrode 11d. In the illustrated example, the pixel electrode PE is a solid electrode (an electrode not provided with a slit or the like). The pixel electrode PE is formed of a transparent conductive material (indium tin oxide (ITO) or indium zinc oxide (IZO, trade name), for example). Although, in this example, a portion of the lower face of the pixel electrode PE is in contact with the upper face of the drain electrode 11d, another configuration in which a portion of the upper face of the pixel electrode PE is in contact with the lower face of the drain electrode 11d may be employed.

The common electrode CE (the first electrode 15) is provided commonly to the plurality of pixels and is electrically connected to, for example, a common voltage wiring line disposed so as to surround a display region. A common voltage is applied to the common electrode CE (the first electrode 15) via the common voltage wiring line. In the illustrated example, an interlayer insulating layer 18 is formed so as to cover the TFT 11 and the pixel electrode PE, and the common electrode CE is formed on the interlayer insulating layer 18. In other words, the common electrode CE is provided on the pixel electrode PE with the interlayer insulating layer 18 interposed therebetween. The common electrode CE is formed of a transparent conductive material (ITO or IZO (trade name), for example).

The common electrode CE (the first electrode 15) includes a plurality of slits 15a. Arrangement of the slits 15a in the common electrode CE will be described in detail below.

The counter substrate 20 includes a substrate 20a, a light blocking layer 21 and a color filter layer 22 supported by the substrate 20a, and an alignment film 24 provided so as to be in contact with the liquid crystal layer 30.

The substrate 20a is transparent and has insulating properties. The substrate 20a is, for example, a glass substrate or a plastic substrate.

The light blocking layer 21 is also referred to as a black matrix. In FIG. 1, the shape of the light blocking layer 21 (an outer edge 21a) is indicated by a dotted line. The light blocking layer 21 is formed of a photosensitive black resin material, for example.

The color filter layer 22 typically includes a red color filter 22R, a green color filter 22G, and a blue color filter 22B. The red color filter 22R, the green color filter 22G, and the blue color filter 22B are formed of, for example, a photosensitive colored resin material.

In the illustrated example, an overcoat layer (a flattening layer) 23 is provided so as to cover the color filter layer 22, and the alignment film 24 is formed on the overcoat layer 23.

The alignment direction of the liquid crystal molecules 31 determined by the alignment film 24 is parallel to or antiparallel to the alignment direction of the liquid crystal molecules 31 determined by the alignment film 14 (the initial alignment direction Di). Like the alignment film 14, the alignment film 24 mainly serves as a horizontal alignment film that determines the alignment direction of the liquid crystal molecules 31.

The pretilt angle of the liquid crystal molecules 31 determined by the alignment films 14 and 24 is typically set to 2° or less. The pretilt angle of the liquid crystal molecules 31 is preferably 0.1° or more and 3.0° or less. The alignment films 14 and 24 may be formed from an organic material or may be formed from an inorganic material. The alignment treatment applied to the alignment films 14 and 24 may be a photo-alignment treatment or a rubbing treatment.

The thickness of the liquid crystal layer 30 is determined by a columnar spacer 27. In the illustrated example, the columnar spacer 27 is formed on the overcoat layer 23. The columnar spacer 27 can be formed from a photosensitive resin material, for example.

The pair of polarizers 41 and 42 are arranged in a crossed-Nicol manner. A transmission axis of one of the pair of polarizers 41 and 42 is substantially parallel to the initial alignment direction Di, and a transmission axis of the other of the polarizers 41 and 42 is substantially orthogonal to the initial alignment direction Di. Although, in FIG. 2, the polarizers 41 is provided on the active matrix substrate 10 opposite to the liquid crystal layer 30, and the polarizers 42 is provided on the counter substrate 20 opposite to the liquid crystal layer 30, arrangement of the polarizers 41 and 42 is not limited to thereto.

Here, the arrangement of the plurality of slits 15a in the common electrode CE (the first electrode 15) will be described.

As illustrated in FIG. 1, each of the plurality of slits 15a extends so as to form an acute angle with the pixel shorthand direction DS smaller than an acute angle formed by the slit 15a and the pixel longitudinal direction DL. That is, each of the slits 15a extends so as to slightly incline with respect to the pixel short-hand direction DS, and the arrangement of the slits 15a in the common electrode CE is the "transverse arrangement".

The plurality of slits 15a include a plurality of first slits 15a1 each extending so as to form an acute angle θ1 in a clockwise direction with respect to the pixel short-hand direction DS and a plurality of second slits 15a2 each extending so as to form an acute angle θ2 in a counterclockwise direction with respect to the pixel short-hand direction DS. In the illustrated example, the first slits 15a1 are disposed in the lower half of the pixel, and the second slits 15a2 are disposed in the upper half of the pixel. That is, in each pixel, the common electrode CE includes a first region R1 in which the first slits 15a1 are formed, and a second region R2 in which the second slits 15a2 are formed. The second region R2 is adjacent to the first region R1 along the pixel longitudinal direction DL. Hereinafter, the first region R1 may be referred to as a "first slit formation region", and the second region R2 may be referred to as a "second slit formation region".

The acute angle θ1 formed by the first slit 15a1 and the pixel short-hand direction DS and the acute angle θ2 formed by the second slit 15a2 and the pixel short-hand direction DS are typically substantially the same, and are, for example, 3° or more and 20° or less. The width of each of the slits 15a is 2 μm or more and 8 μm or less, for example, and the interval between the adjacent slits 15a is 1 μm or more and 7 μm or less, for example. The number of slits 15a is not limited to that illustrated in FIG. 1.

Figure 3:
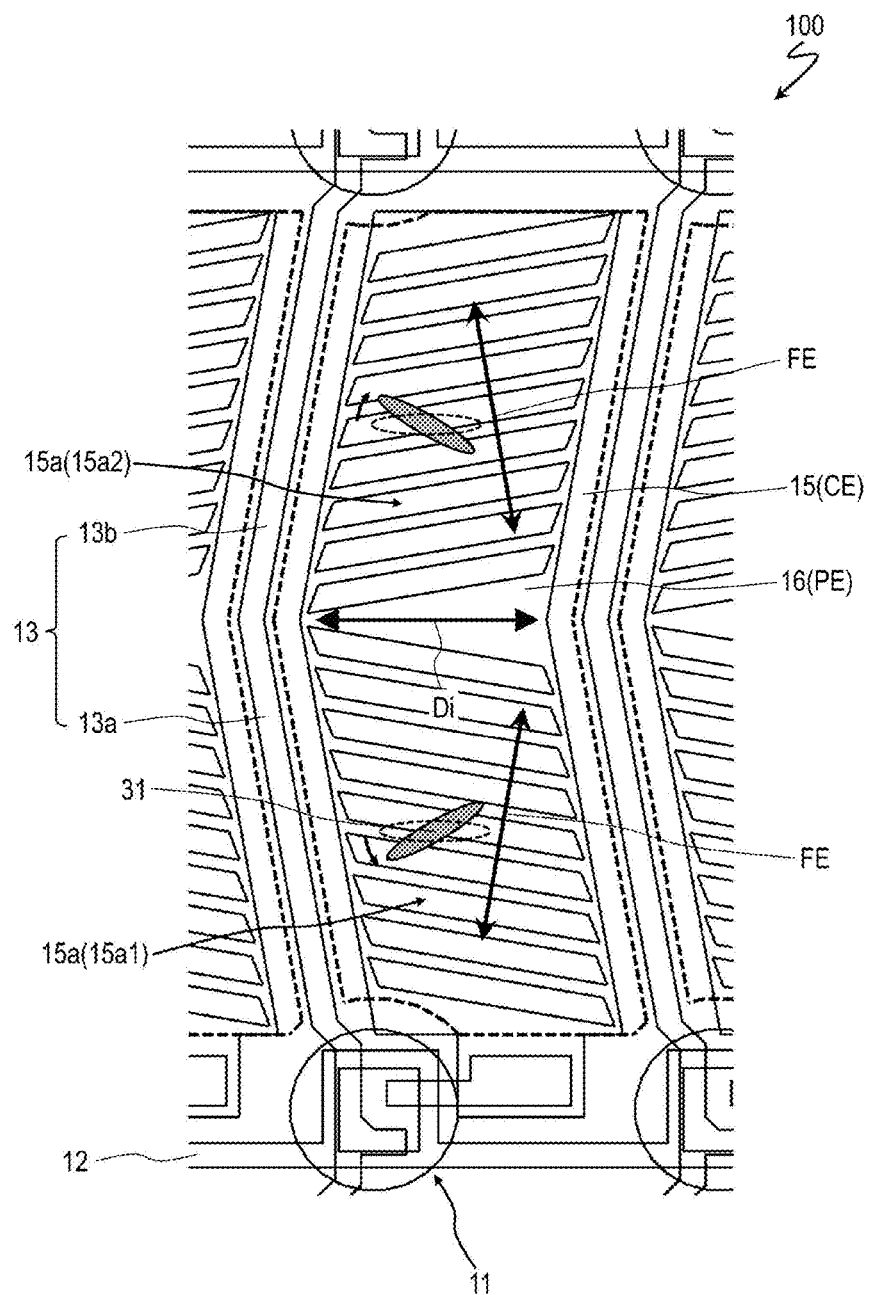
FIG. 3 is a diagram schematically illustrating an alignment state of liquid crystal molecules 31 when a voltage is applied between a pixel electrode PE and a common electrode CE.

FIG. 3 is a diagram schematically illustrating an alignment state of the liquid crystal molecules 31 when a voltage is applied between the pixel electrode PE and the common electrode CE. When a voltage is applied between the pixel electrode PE and the common electrode CE, a fringe electrical field FE is generated in the liquid crystal layer 30. In a plan view (when viewed in the normal direction of the display surface), the direction of the fringe electrical field FE is orthogonal to the direction in which the slits 15a of the common electrode CE extend. In the liquid crystal layer 30 formed of a positive nematic liquid crystal material, torque acts on the liquid crystal molecules 31 to change the alignment direction such that the directions of the major axes of the liquid crystal molecules 31 become closer to that direction. Therefore, the liquid crystal molecules 31 in the lower half of the pixel (the first slit formation region R1 of the common electrode CE) rotate counterclockwise, and the liquid crystal molecules 31 in the upper half of the pixel (the second slit formation region R2 of the common electrode CE) rotate clockwise. In this manner, the fringe electrical field FE generated by the pixel electrode PE and the common electrode CE aligns the liquid crystal molecules 31 in a direction different from the initial alignment direction Di.

In the liquid crystal display device 100 according to the present embodiment, each of the source wiring lines 13 extends so as to intersect the row direction, but is not straight. A more specific description of the configuration of the source wiring lines 13 will be made as follows.

As illustrated in FIG. 1, in a plan view (i.e., when viewed in the normal direction of the display surface), the source wiring line 13 is bent at a position corresponding to a boundary BD between the first region R1 and the second region R2 of the common electrode CE. Here, the boundary BD between the first region R1 and the second region R2 refers to an imaginary line that is substantially equidistant from the closest one to the second region R2 of the first slits 15a1 of the first region R1, and the closest one to the first region R1 of the second slits 15a2 of the second region R2. The source wiring line 13 is bent on the imaginary line or on an extended line of the imaginary line. A part 13a of the source wiring line 13 adjacent to the first region R1 (hereinafter referred to as a "first part") extends in a first direction D1 inclined with respect to the column direction (i.e., also inclined with respect to the pixel longitudinal direction DL). On the other hand, a part 13b of the source wiring line 13 adjacent to the second region R2 (hereinafter referred to as a "second part") extends in a second direction D2 inclined with respect to the column direction (i.e., also inclined with respect to the pixel longitudinal direction DL) and being different from the first direction D1.

In the illustrated example, the first part 13a of the source wiring line 13 extends so as to form an acute angle $\theta_3$ in a counterclockwise direction with respect to the pixel longitudinal direction DL, and the second part 13b of the source wiring line 13 extends so as to form an acute angle $\theta_4$ in a clockwise direction with respect to the pixel longitudinal direction DL. The acute angle $\theta_3$ formed by the first part 13*a* of the source wiring line 13 and the pixel longitudinal direction DL and the acute angle $\theta_4$ formed by the second part 13*b* of the source wiring line 13 and the pixel longitudinal direction DL are typically substantially the same, and are, for example, 3° or more and 20° or less.

Figure 4:
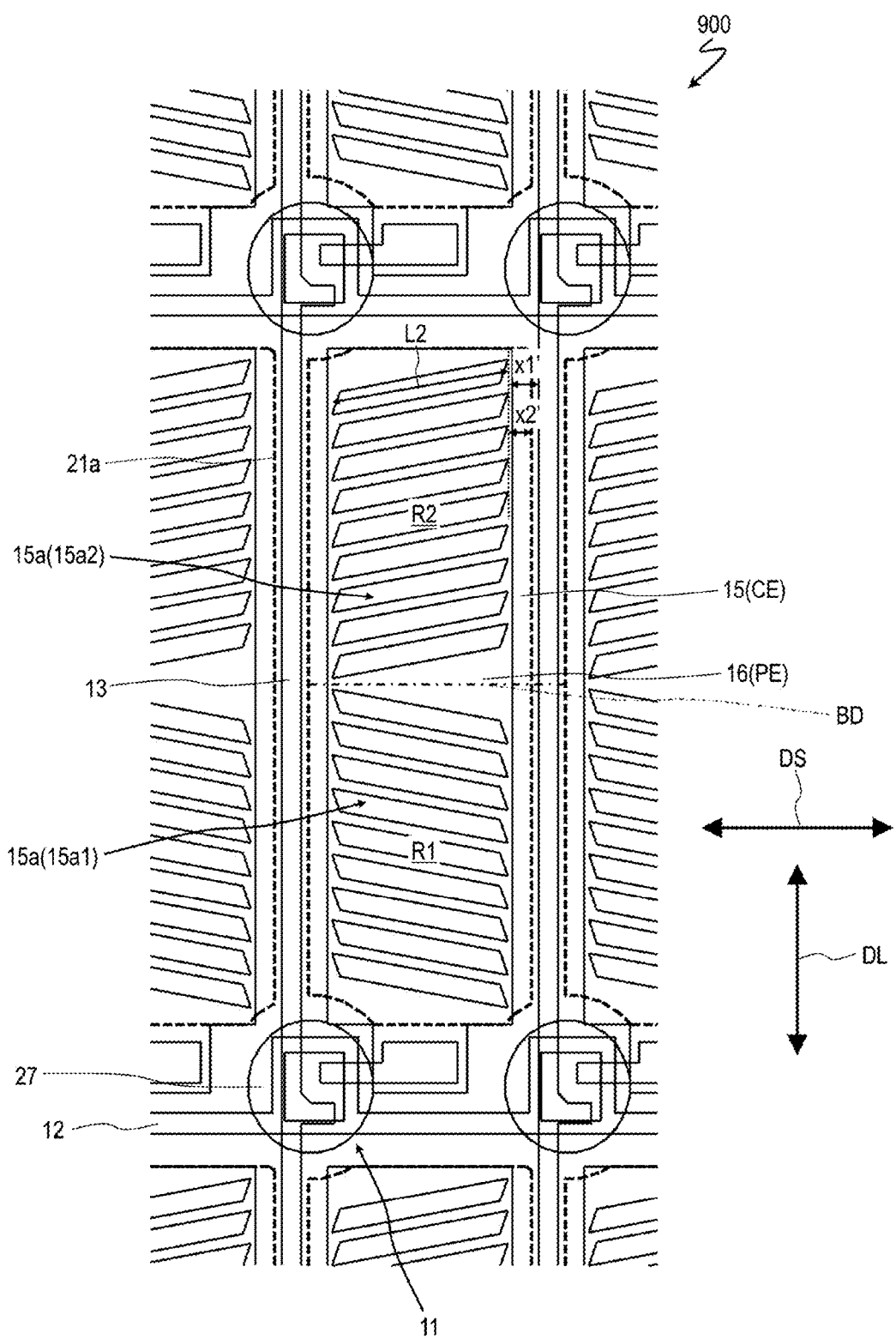
FIG. 4 is a plan view schematically illustrating a liquid crystal display device 900 according to a comparative example.

The liquid crystal display device 100 according to the present embodiment having the above-described configuration of the source wiring line 13 can further improve the aperture ratio. Hereinafter, the reason for the above is described in comparison to a liquid crystal display device 900 according to a comparative example illustrated in FIG. 4.

The liquid crystal display device 900 according to the comparative example is different from the liquid crystal display device 100 in that the source wiring line 13 is not bent at a position corresponding to the boundary BD between the first region R1 and the second region R2 of the common electrode CE and is straight.

As described above, by setting distances x1 and x1' (see FIGS. 1 and 4, respectively) from the source wiring line 13 to the end of the slit 15*a* and distances x2 and x2' (see FIGS. 1 and 4, respectively) from the light blocking layer (black matrix) 21 to the slit end to be a certain distance or more, it is possible to suppress adverse effect on display caused by the potential of the source wiring line 13 during a period in which a source signal is held in a pixel, a color mixing defect which means a mixed state of colors when seen diagonally, and the like.

When the same pixel size and the same arrangement rule (i.e., x1=x1', x2=x2') are employed in the liquid crystal display device 100 according to the present embodiment and the liquid crystal display device 900 according to the comparative example, a length L1 of the slit 15*a* in the liquid crystal display device 100 according to the present embodiment is longer than a length L2 of the slit 15*a* in the liquid crystal display device 900 according to the comparative example, for the reason described below. Therefore, as compared to the liquid crystal display device 900 according to the comparative example, the liquid crystal display device 100 according to the present embodiment has a larger region that contributes to display, which results in higher transmittance. Therefore, the liquid crystal display device 100 according to the present embodiment can further improve the aperture ratio.

Hereinafter, the reason why the length L1 of the slit 15*a* in the liquid crystal display device 100 according to the present embodiment is longer than the length L2 of the slit 15*a* in the liquid crystal display device 900 according to the comparative example will be described.

In cases where the inclination angles (the acute angles $\Theta 3$ and $\Theta 4$) of the source wiring lines 13 are not so large, the distance between the adjacent source wiring lines 13 in the liquid crystal display device 100 according to the present embodiment is substantially equal to that in the liquid crystal display device 900 according to the comparative example, and the smallest length of the slit 15*a* is given when the slit 15*a* is disposed orthogonally to the direction in which the source wiring line 13 extends (that is, when the direction in which the source wiring line 13 extends and the direction in which the slit 15*a* extends are orthogonal to each other). In the liquid crystal display device 100 according to the present embodiment, the relationship between the direction in which the source wiring line 13 extends and the direction in which the slit 15*a* extends is more non-orthogonal as compared with the liquid crystal display device 900 according to the comparative example. Therefore, the length L1 of the slit 15*a* in the liquid crystal display device 100 according to the present embodiment is longer than the length L2 of the slit 15*a* in the liquid crystal display device 900 according to the comparative example.

Figure 5:
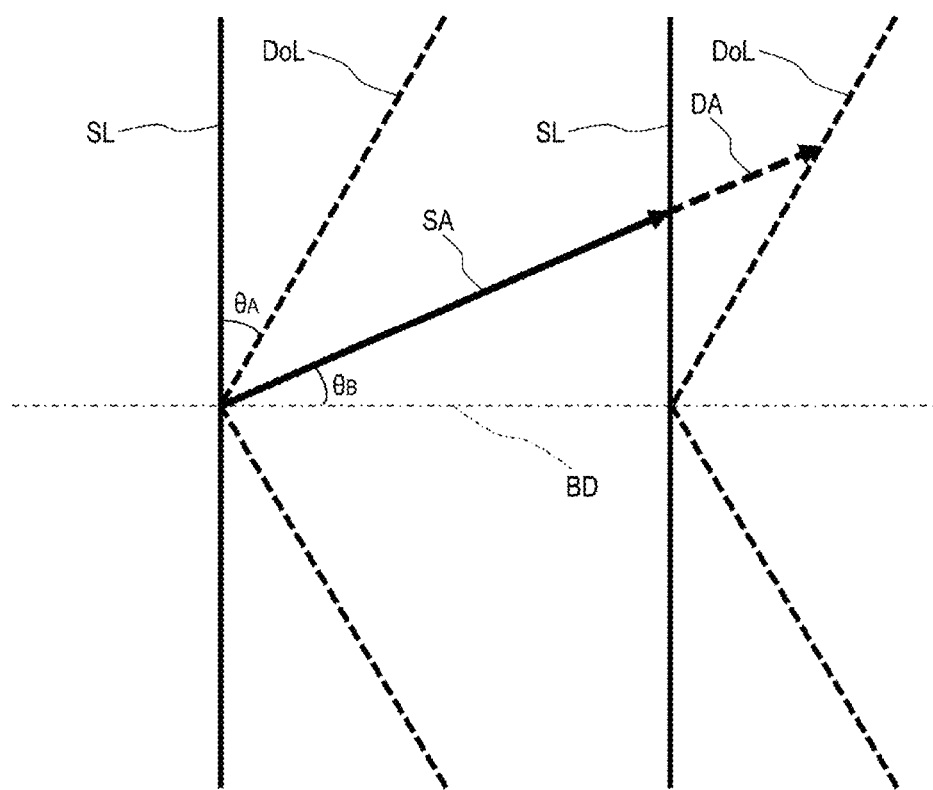
FIG. 5 is a schematic diagram demonstrating that a slit 15a of the liquid crystal display device 100 has a length L1 longer than a length L2 of the slit 15a of the liquid crystal display device 900 according to the comparative example.

FIG. 5 is a schematic diagram demonstrating that the slit 15*a* of the liquid crystal display device 100 according to the present embodiment has the length L1 longer than the length L2 of the slit 15*a* of the liquid crystal display device 900 according to the comparative example. In FIG. 5, a solid line SL corresponds to the source wiring line 13 in the liquid crystal display device 900 according to the comparative example, and a bent dotted line DoL corresponds to the source wiring line 13 in the liquid crystal display device 100 according to the present embodiment. An angle $\theta_A$ in FIG. 5 corresponds to the inclination angle of the source wiring line 13 (the acute angle $\theta_3$ or $\theta_4$), and an angle $\theta_B$ corresponds to the inclination angle of the slit 15*a* (the acute angle $\theta_1$ or $\theta_2$).

When the length L2 of the slit 15*a* in the liquid crystal display device 900 according to the comparative example is represented by the length of a solid line arrow SA, the length L1 of the slit 15*a* in the liquid crystal display device 100 according to the present embodiment is represented by the sum of the length of the solid line arrow SA and the length of a dotted line arrow DA. That is, the liquid crystal display device 100 according to the present embodiment includes the slit 15*a* longer by the length of the dotted line arrow DA.

Figure 6:
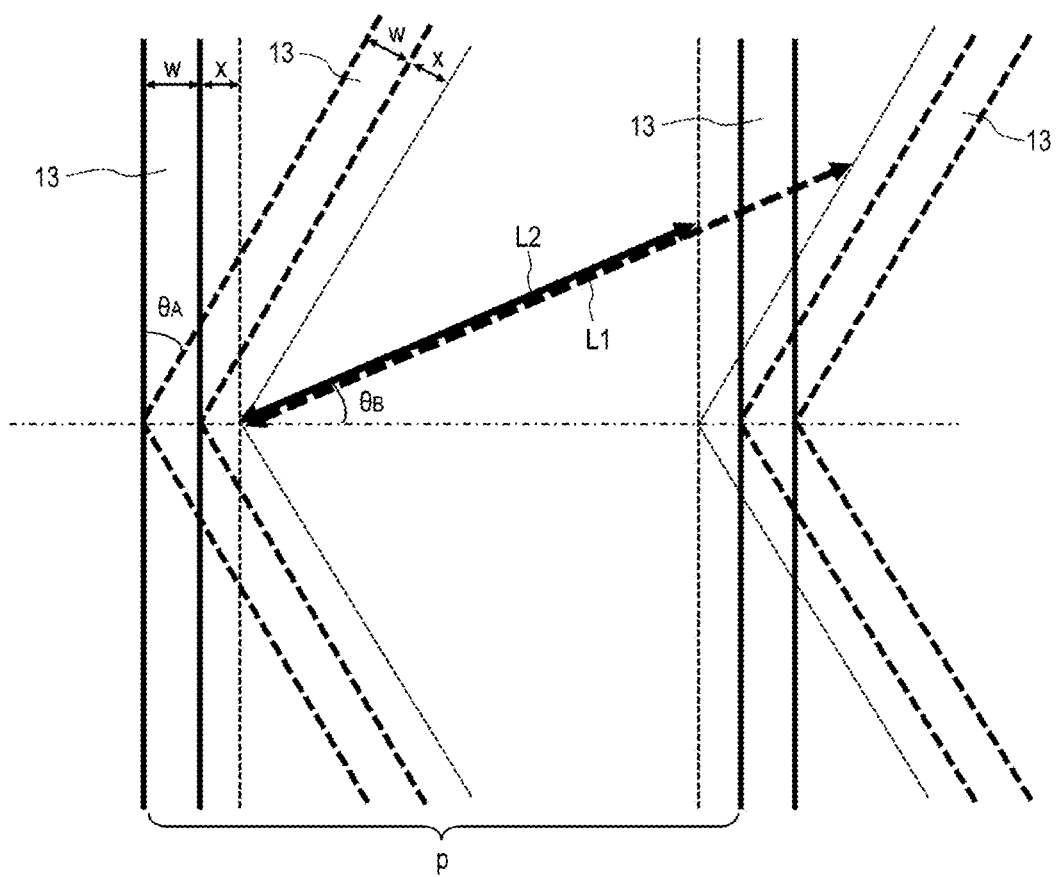
FIG. 6 is a schematic diagram demonstrating that the slit 15a of the liquid crystal display device 100 has the length L1 longer than the length L2 of the slit 15a of the liquid crystal display device 900 according to the comparative example.

FIG. 6 is another schematic diagram demonstrating that the slit 15*a* of the liquid crystal display device 100 according to the present embodiment has the length L1 longer than the length L2 of the slit 15*a* of the liquid crystal display device 900 according to the comparative example. In FIG. 6, the source wiring lines 13 in the liquid crystal display device 900 according to the comparative example are indicated by solid lines, and the source wiring lines 13 in the liquid crystal display device 100 according to the present embodiment are indicated by dotted lines. In addition, in FIG. 6, x represents a distance from the source wiring line 13 to the end of the slit 15*a* (corresponding to the distance x1 in FIG. 1 or the distance x1' in FIG. 4).

From FIG. 6, it can also be seen that the slit 15*a* of the liquid crystal display device 100 according to the present embodiment has the length L1 longer than the length L2 of the slit 15*a* of the liquid crystal display device 900 according to the comparative example. The length L of the slit 15*a* is represented by the following equation:

$$L=\{p-(w+2x)/\cos\theta_A\}\times\{\cos\theta_A/\cos(\theta_A+\theta_B)\}$$

where w is the width of the source wiring line 13, p is a pixel pitch in the pixel short-hand direction DS, and L represents both the length of the slit 15*a* in the liquid crystal display device 100 according to the present embodiment and the length of the slit 15*a* in the liquid crystal display device 900 according to the comparative example.

In practically possible designs (in which $\theta_A$ and $\theta_B$ are each from 3° to 20°, for example), a greater inclination angle $\theta_A$ of the source wiring line 13 or a greater inclination angle $\theta_B$ of the slit 15*a* results in a longer length L of the slit 15*a*, unless the pixel pitch p is extremely small, the width w of the source wiring line 13 is extremely large, or the distance x from the source wiring line 13 to the end of the slit 15*a* is extremely long.

Figure 7:
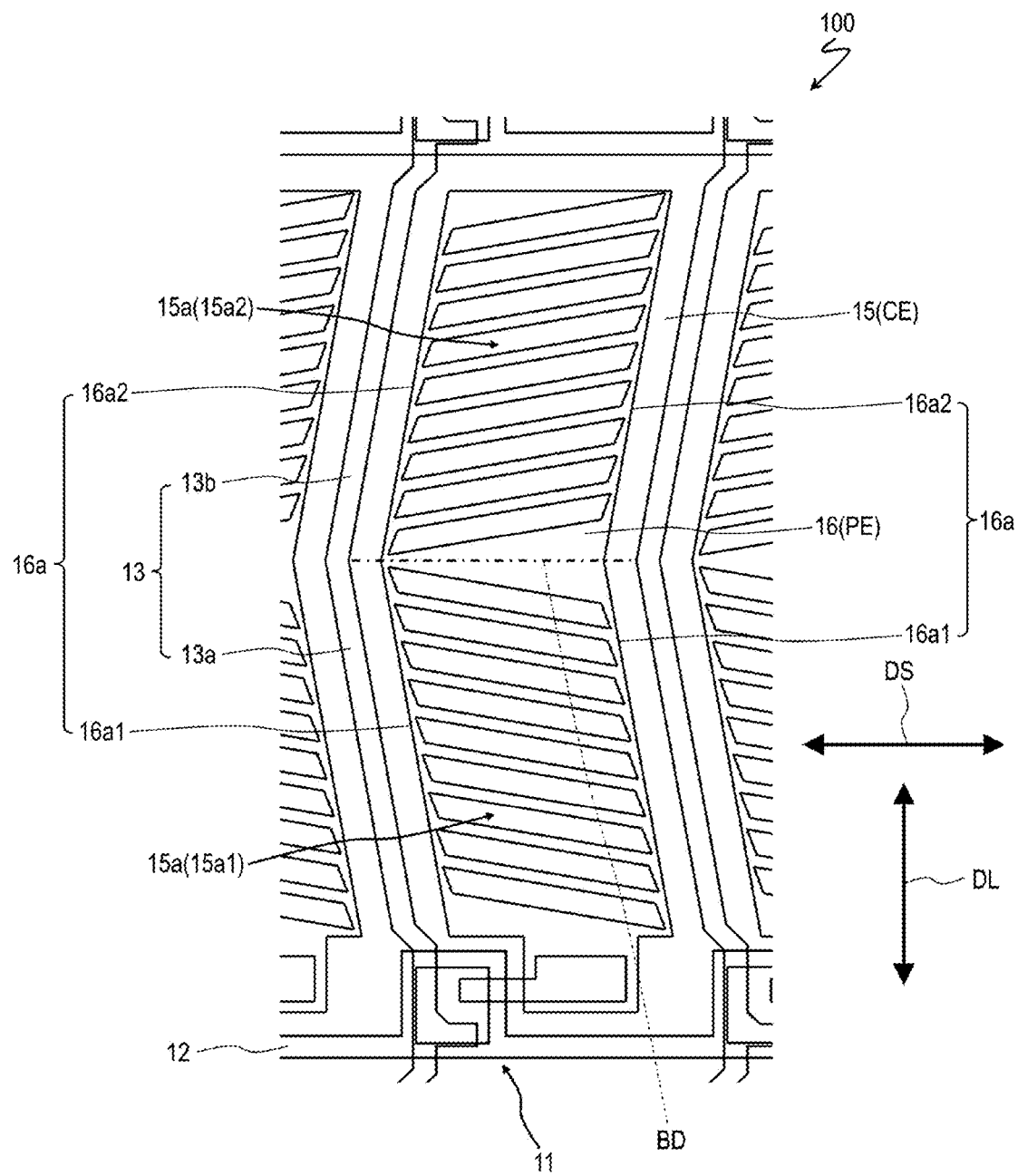
FIG. 7 is a plan view schematically illustrating the liquid crystal display device 100.

Here, the shape of the pixel electrode PE will be described with reference to FIG. 7. As illustrated in FIG. 7, the pixel electrode PE is bent at a position corresponding to the boundary BD between the first region R1 and the second region R2 of the common electrode CE. When two parts 16*a* of the outer edge of the pixel electrode PE corresponding to both ends in the pixel short-hand direction DS are referred to as "long sides" of the pixel electrode PE, each of the pair of long sides 16a includes a part 16a1 adjacent to the first part 13a of the source wiring line 13 and extending in the same direction as the direction in which the first part 13a extends, and a part 16a2 adjacent to the second part 13b of the source wiring line 13 and extending in the same direction as the direction in which the second part 13b extends.

Next, a preferred configuration of the liquid crystal display device 100 according to the present embodiment will be described.

In the illustrated example, the columnar spacer 27 is disposed so as to be located over the channel region 11ac of the TFT 11 in a plan view. The columnar spacer 27 disposed in this manner allows a part of the light blocking layer 21 for light blocking for the channel region 11ac of the TFT 11 (hereinafter referred to as a "TFT light blocking portion"), to also serve as a part for light blocking for alignment disorder around the columnar spacer 27 (or a bright spot resulting from the alignment film 14 being abraded by the columnar spacer 27). As a result, a decrease in the aperture ratio can be suppressed. In addition, it is preferable that the TFT light blocking portion overlap a part of the pixel that contributes little to display, that is, a part where the slit 15a is not formed (in the illustrated example, the upper left part and lower left part of the pixel). In the illustrated example, the source wiring line 13 is bent not only at the position corresponding to the boundary BD between the first slit formation region R1 and the second slit formation region R2 but also in the vicinity of the intersection between the source wiring line 13 and the gate wiring line 12. Such a configuration may be employed to adjust the position of the TFT 11.

Here, the initial alignment direction determined by the alignment films 14 and 24 is substantially parallel to the row direction (i.e., substantially the same as the direction in which the gate wiring line 12 extends). As a result, the gate wiring line 12 and the light blocking layer 21 can be used for light blocking for an alignment defect at a part around the columnar spacer 27 (a part which is hidden by the columnar spacer 27 during the rubbing treatment and where an alignment regulating force by the alignment film 24 is weak) due to the alignment treatment such as the rubbing treatment, and thus a contrast ratio can be kept high.

If there is a region where the direction in which the source wiring line 13 extends and the direction in which the slit 15a adjacent to the source wiring line 13 extends are substantially parallel to each other, such a region tends to have an alignment defect. In the present embodiment, there is substantially no region in which the direction in which the source wiring line 13 extends and the direction in which the slit 15a adjacent to the source wiring line 13 extends are substantially parallel to each other, and thus the occurrence of such an alignment defect is suppressed.

Figure 8:
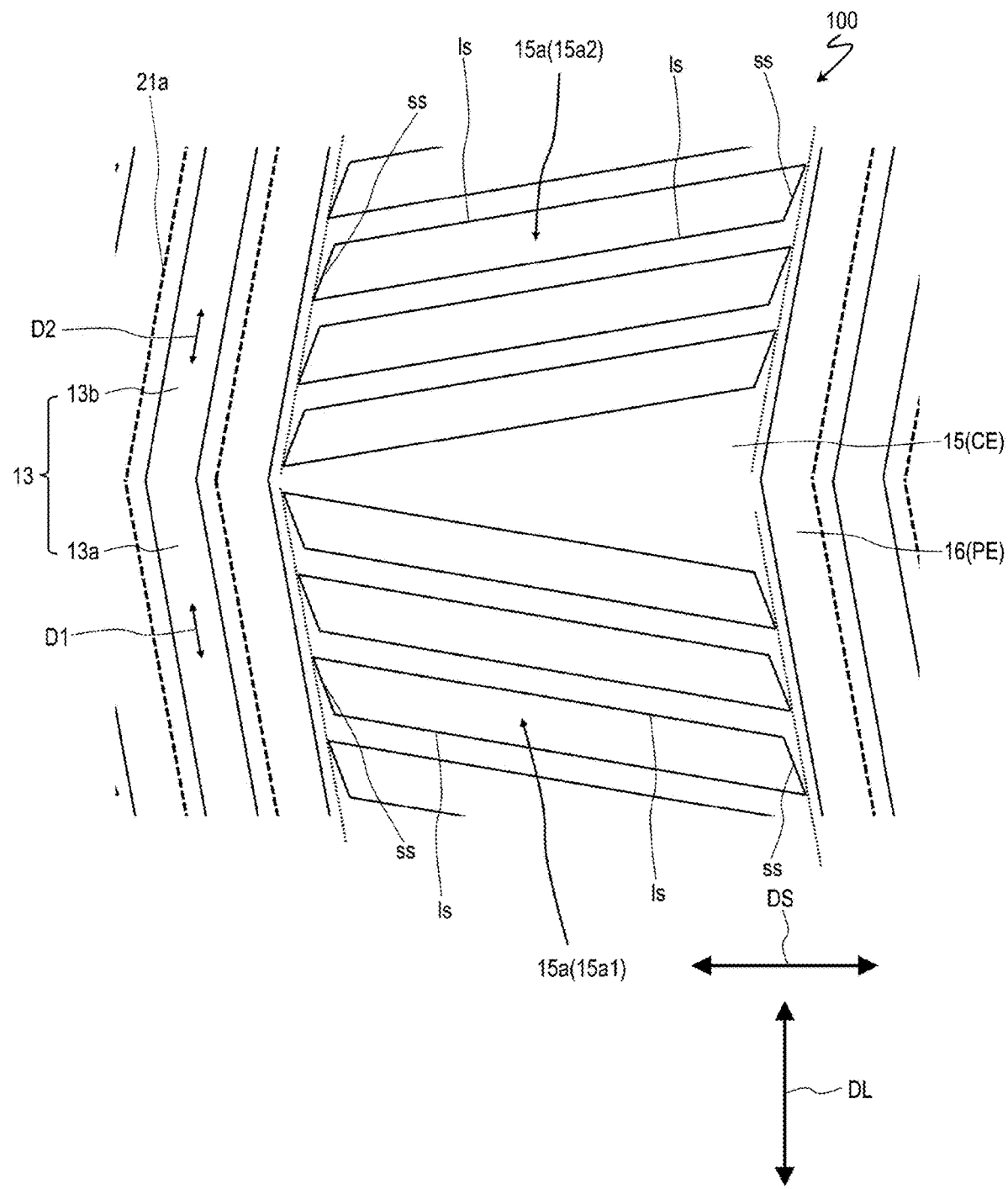
FIG. 8 is an enlarged view of the slit 15a of the common electrode CE.

FIG. 8 is an enlarged view of the slits 15a of the common electrode CE. Each of the slits 15a has a substantially quadrangular shape (a substantially parallelogrammical shape in the illustrated example), and the outer edge of each of the slits 15a has a pair of long sides ls and a pair of short sides ss. The pair of short sides ss are located at both ends of each of the slits 15a in the pixel short-hand direction DS.

Each of the pair of short sides ss of each of the first slits 15a1 is slightly inclined with respect to the first direction D1 (the direction in which the first part 13a of the source wiring line 13 extends), and more specifically forms an angle of 5° or more and 30° or less with the first direction D1. Each of the pair of short sides ss of each of the second slits 15a2 is slightly inclined with respect to the second direction D2 (the direction in which the second part 13b of the source wiring line 13 extends), and more specifically forms an angle of 5° or more and 30° or less with the second direction D2. In other words, each of the pair of short sides ss of each of the first slits 15a1 and each of the pair of short sides ss of each of the second slits 15a2 are inclined with respect to the long side 16a (the parts 16a1 and 16a2) of the pixel electrode PE. Such a configuration can increase a region where directions of rotation of the liquid crystal molecules 31 by a fringe electrical field generated in the vicinity of the short side ss of the slit 15a are close to the direction of rotation of the liquid crystal molecules 31 by the intended fringe electrical field FE generated by the slit 15a (see FIG. 3), compared to a case where the short side ss of the first slit 15a1 is parallel to the first direction D1 or a case where the short side ss of the second slit 15a2 is parallel to the second direction D2, and thus can reduce the area of a dark portion at or in the vicinity of the outer periphery of the pixel.

Figure 9:
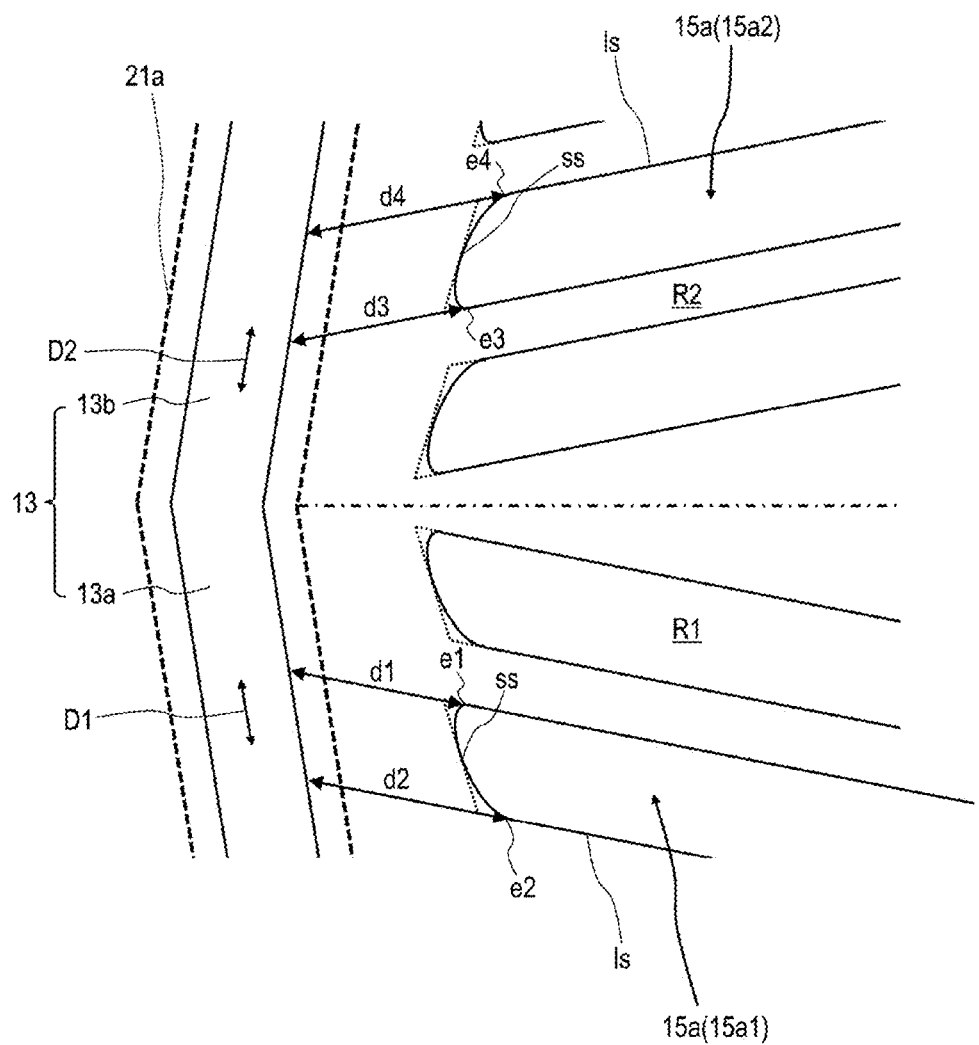
FIG. 9 is an enlarged view of a short side ss of the slit 15a and the vicinity thereof.

FIG. 9 is an enlarged view of the short side ss of the slit 15a and the vicinity thereof. Even if the short side ss of the slit 15a is designed to be straight, the short side ss may be rounded (that is, the pattern may be blunt) due to an unavoidable reason in manufacturing, as illustrated in FIG. 9.

In the case where the short side ss of the first slit 15a1 is designed to slightly incline with respect to the first direction D1, even if the short side ss is rounded, a distance d2 from an end e2 of the short side ss on the opposite side to the second region R2 to the source wiring line 13 is greater than a distance d1 from an end e1 of the short side ss on the second region R2 side to the source wiring line 13. In addition, in the case where the short side ss of the second slit 15a2 is designed to slightly incline with respect to the second direction D2, even if the short side ss is rounded, a distance d4 from an end e4 of the short side ss on the opposite side to the first region R1 to the source wiring line 13 is greater than a distance d3 from an end e3 of the short side ss on the first region R1 side to the source wiring line 13.

Figure 10:
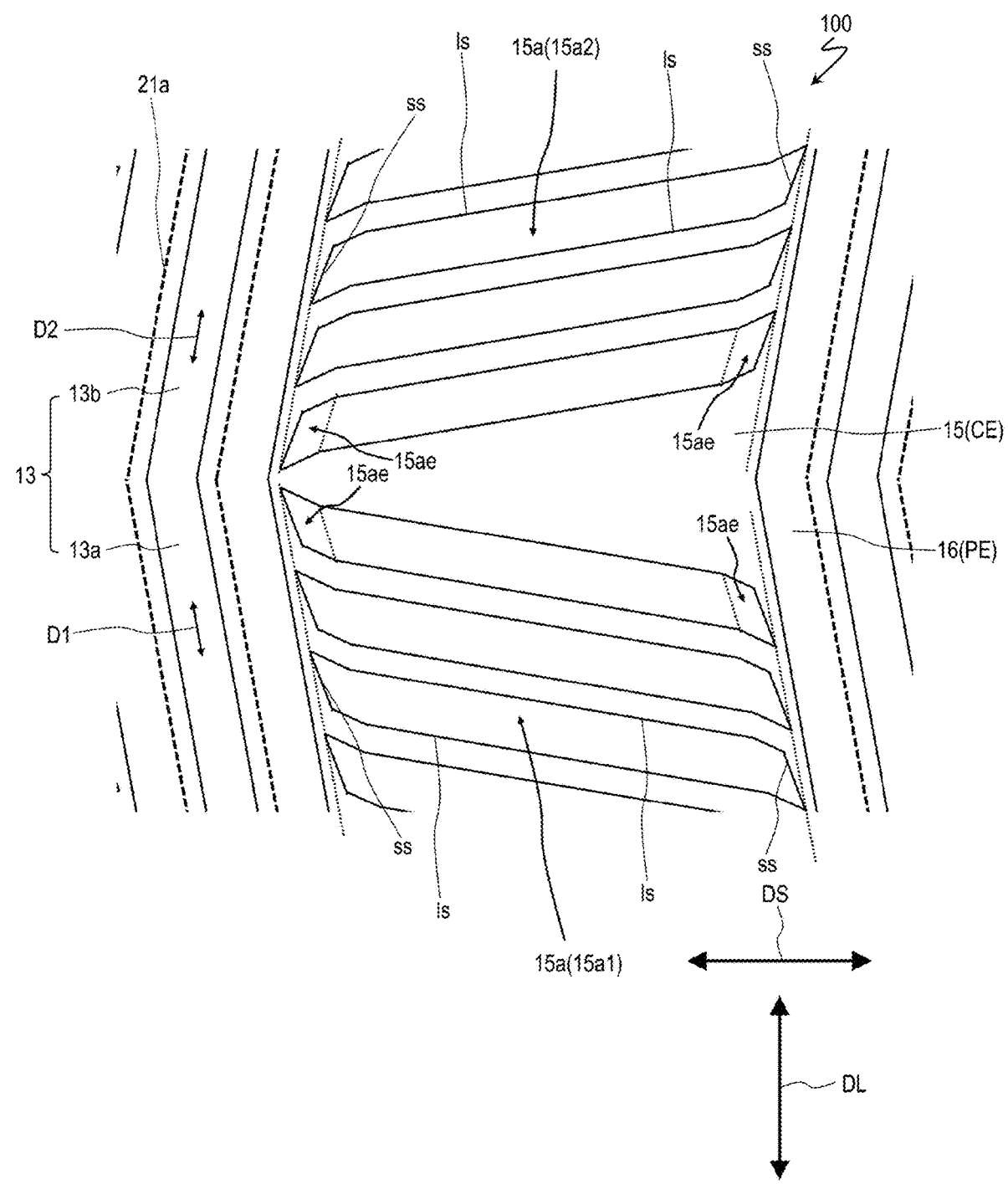
FIG. 10 is an enlarged view of the slit 15a of the common electrode CE.

FIG. 10 is a diagram illustrating another configuration example of the slits 15a of the common electrode CE (the first electrode 15). In the example illustrated in FIG. 10, similarly to the example illustrated in FIG. 8, each of the pair of short sides ss of each of the first slits 15a1 is slightly inclined (at an angle of 5° or more and 30° or less) with respect to the first direction D1, and each of the pair of short sides ss of each of the second slits 15a2 is slightly inclined (at an angle of 5° or more and 30° or less) with respect to the second direction D2. Thus, the area of the dark portion generated at or in the vicinity of the outer periphery of the pixel can be reduced.

In the example illustrated in FIG. 10, each of the slits 15a is bent at or in the vicinity of both ends thereof. More specifically, both end portions 15ae of each of the slits 15a are inclined with respect to the pixel short-hand direction DS at an angle larger than that of the rest of the slit 15a (that is, both end portions 15ae of the first slit 15a1 are inclined at an angle larger than the acute angle $\theta_1$, and both end portions 15ae of the second slit 15a2 are inclined at an angle larger than the acute angle $\theta_2$). By adopting such a configuration for the slits 15a, the effect of reducing the area of the dark portion can be further enhanced.

Method for Manufacturing Liquid Crystal Display Device

A method for manufacturing the liquid crystal display device 100 will now be described. The counter substrate 20 can be manufactured and the liquid crystal layer 30 can be formed by using various publicly known methods, and thus, descriptions thereof will be omitted here. A method for manufacturing the active matrix substrate 10 will be described below with reference to FIGS. 11A to 11H.

Figure 11A:
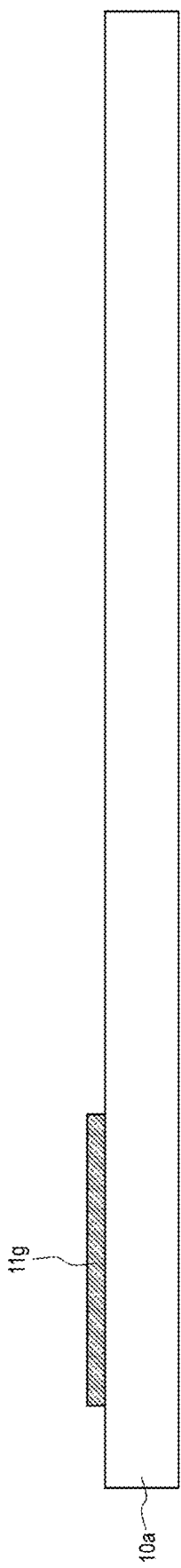
FIG. 11A is a process cross-sectional view illustrating a manufacturing process for an active matrix substrate 10.

First, the gate electrode 11g is formed on the substrate 10a as illustrated in FIG. 11A. At this time, the gate wiring line 12 is also formed. For example, the gate electrode 11g and the gate wiring line 12 can be formed by depositing a conductive film on the substrate 10a by using a sputtering method and then patterning the conductive film by using a photolithography process.

Figure 11B:
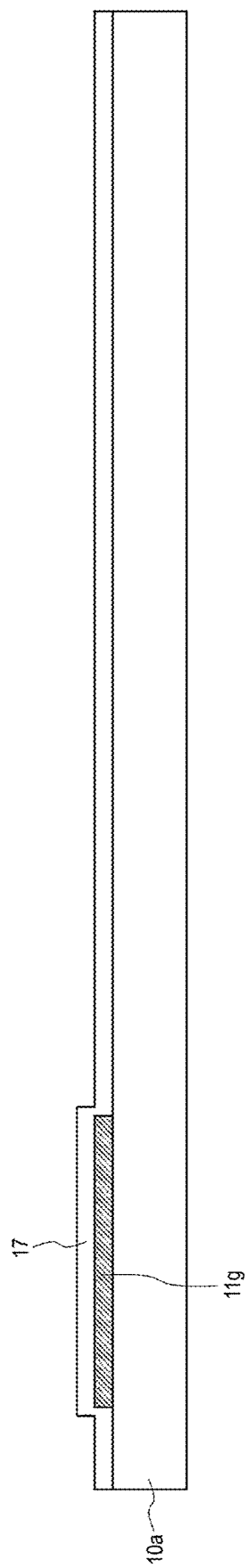
FIG. 11B is a process cross-sectional view illustrating a manufacturing process for the active matrix substrate 10.

Next, as illustrated in FIG. 11B, the gate insulating layer 17 is formed so as to cover the gate electrode 11g and the gate wiring line 12. The gate insulating layer 17 can be formed, for example, by using chemical vapor deposition (CVD). The gate insulating layer 17 may have a layered structure including, for example, a silicon nitride (SiNx) layer as a lower layer and a silicon oxide ($SiO_2$) layer as an upper layer.

Figure 11C:
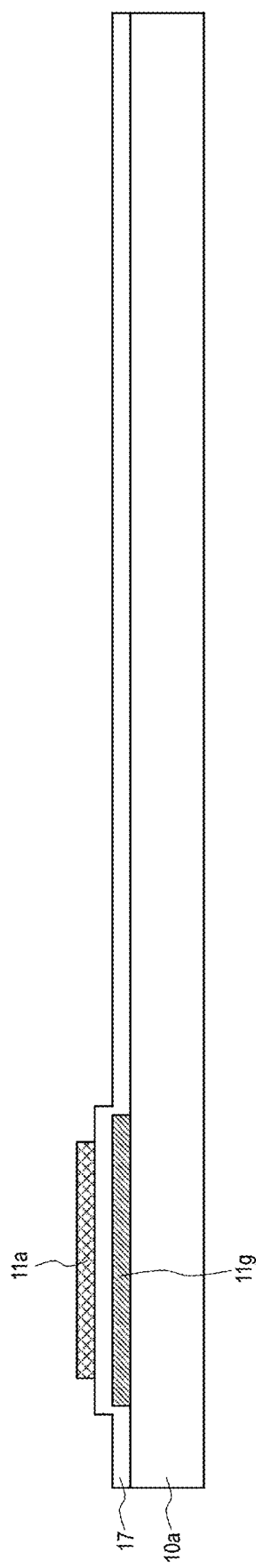
FIG. 11C is a process cross-sectional view illustrating a manufacturing process for the active matrix substrate 10.

Subsequently, as illustrated in FIG. 11C, the semiconductor layer 11a is formed on the gate insulating layer 17. For example, the semiconductor layer 11a can be formed by depositing a semiconductor film on the gate insulating layer 17 and then patterning the semiconductor film using a photolithography process. Suitable examples of a material of the semiconductor layer include, but of course not limited to, oxide semiconductors.

Figure 11D:
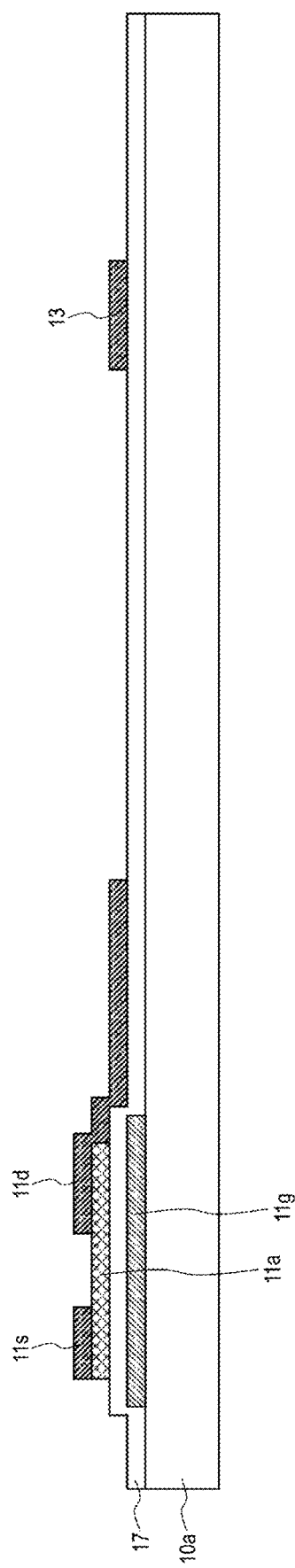
FIG. 11D is a process cross-sectional view illustrating a manufacturing process for the active matrix substrate 10.

Thereafter, as illustrated in FIG. 11D, the source electrode 11s, the drain electrode 11d, and the source wiring line 13 are formed. For example, the source electrode 11s, the drain electrode 11d, and the source wiring line 13 can be formed by depositing a conductive film on the semiconductor layer 11a and the gate insulating layer 17, and then patterning the conductive film using a photolithography process.

Figure 11E:
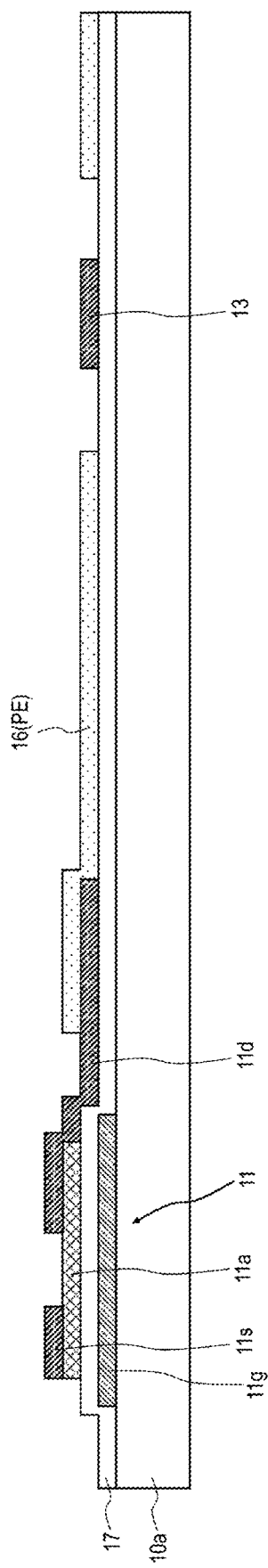
FIG. 11E is a process cross-sectional view illustrating a manufacturing process for the active matrix substrate 10.

Then, as illustrated in FIG. 11E, the pixel electrode PE (the second electrode 16) is formed. For example, the pixel electrode PE can be formed by depositing a transparent conductive film, and then patterning the transparent conductive film using a photolithography process. As the material of the transparent conductive film, ITO, for example, can be used.

Figure 11F:
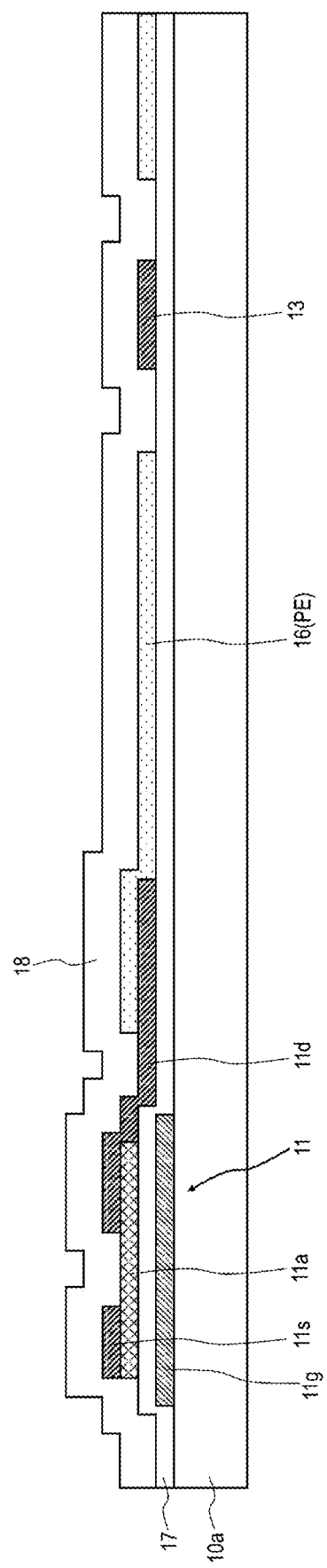
FIG. 11F is a process cross-sectional view illustrating a manufacturing process for the active matrix substrate 10.

Then, as illustrated in FIG. 11F, the interlayer insulating layer 18 is formed so as to cover the TFT 11, the source wiring line 13, and the pixel electrode PE. The interlayer insulating layer 18 can be formed by depositing an inorganic insulating material using, for example, CVD. The interlayer insulating layer 18 may have a layered structure including, for example, a silicon oxide ($SiO_2$) layer as a lower layer and a silicon nitride (SiNx) layer as an upper layer.

Thereafter, the interlayer insulating layer 18 is patterned using a photolithography process to form a contact hole at a predetermined position in the interlayer insulating layer 18. In the present embodiment, no contact hole is formed in the display region.

Figure 11G:
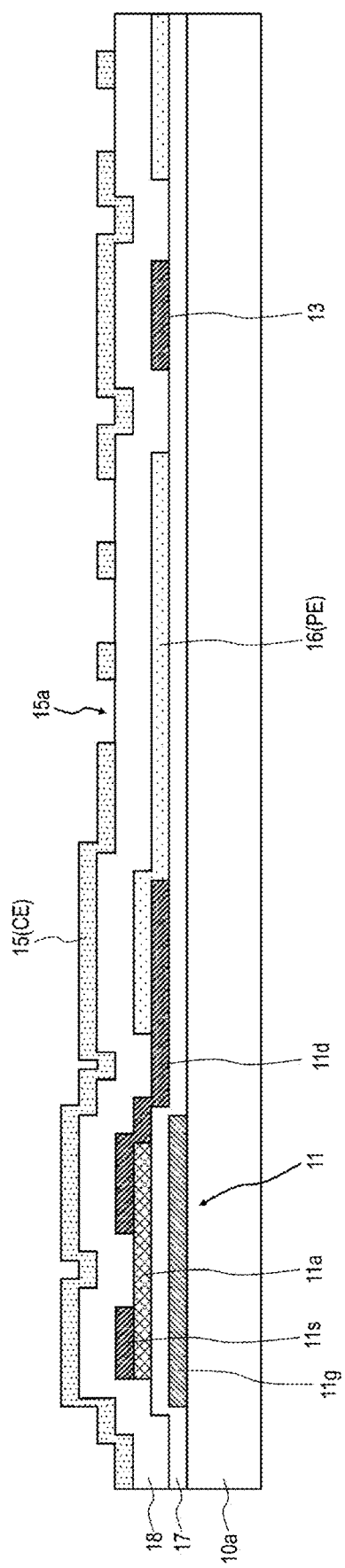
FIG. 11G is a process cross-sectional view illustrating a manufacturing process for the active matrix substrate 10.

Subsequently, as illustrated in FIG. 11G, the common electrode CE (the first electrode 15) is formed on the interlayer insulating layer 18. For example, the common electrode CE including the plurality of slits 15a can be formed by depositing a transparent conductive film on the interlayer insulating layer 18, and then patterning the transparent conductive film using a photolithography process. As the material of the transparent conductive film, ITO, for example, can be used.

Figure 11H:
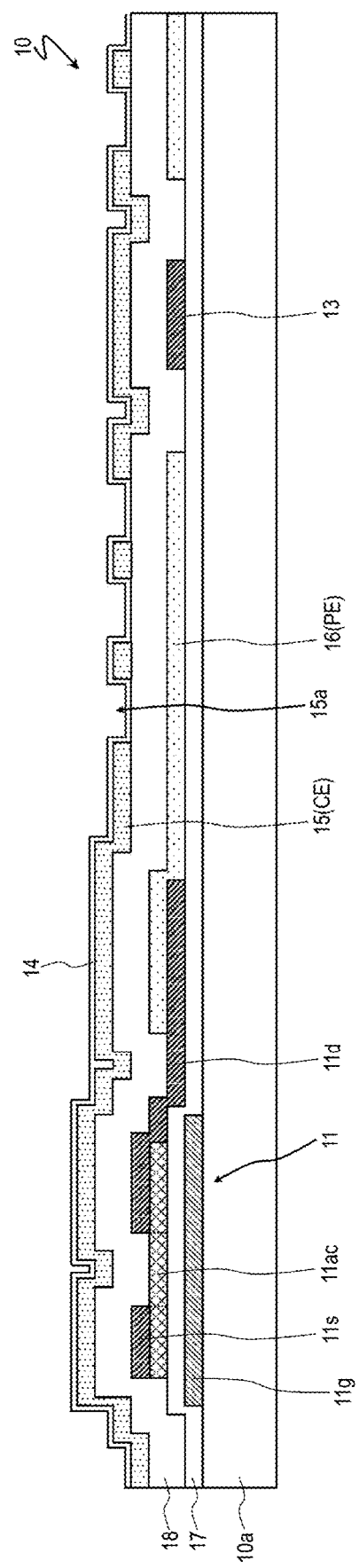
FIG. 11H is a process cross-sectional view illustrating a manufacturing process for the active matrix substrate 10.

Thereafter, as illustrated in FIG. 11H, the alignment film 14 is formed throughout the surface so as to cover the common electrode CE. As a result, the active matrix substrate 10 can be obtained.

Second Embodiment

Figure 12:
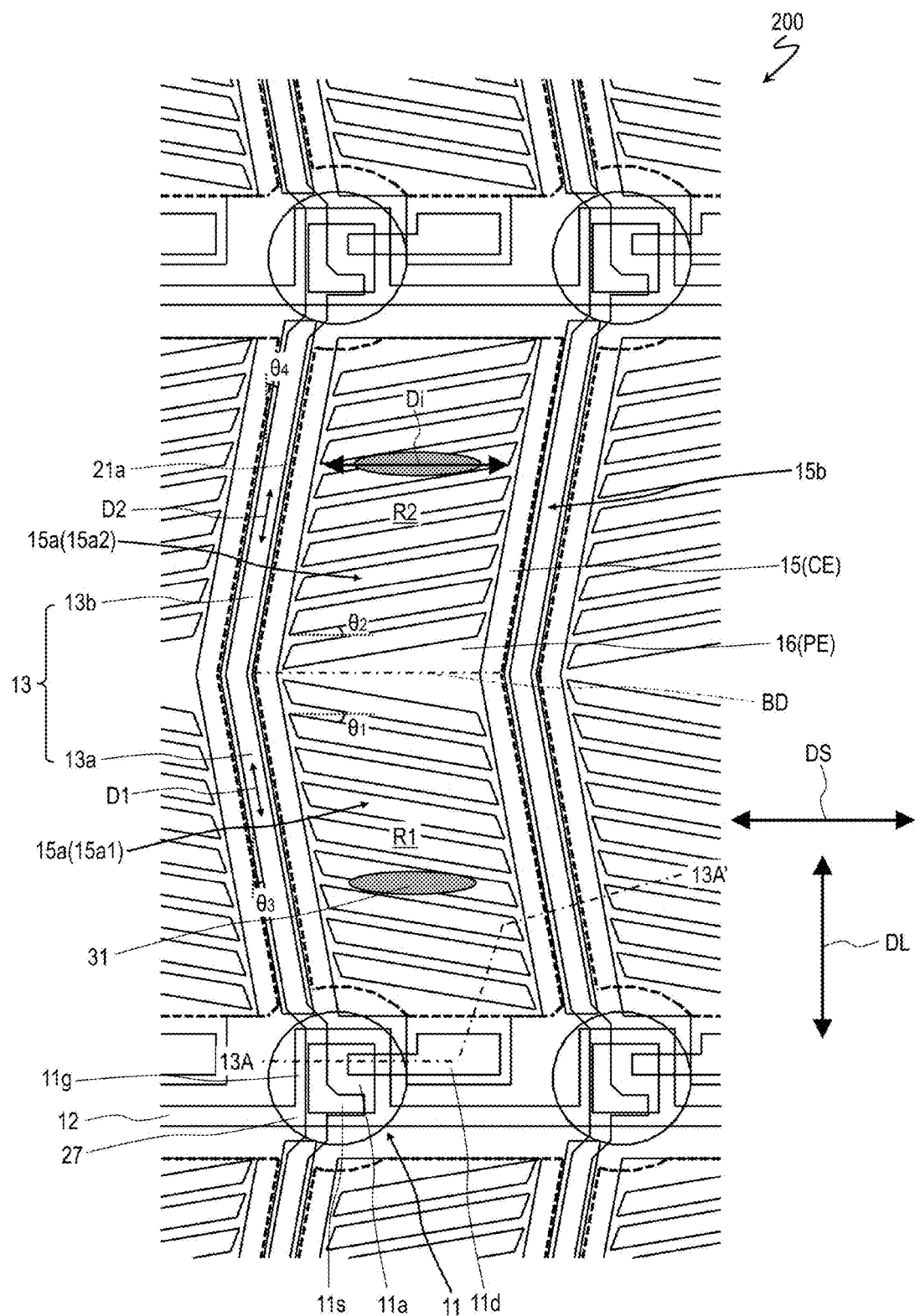
FIG. 12 is a plan view schematically illustrating another liquid crystal display device 200 according to an embodiment of the disclosure.
Figure 13:
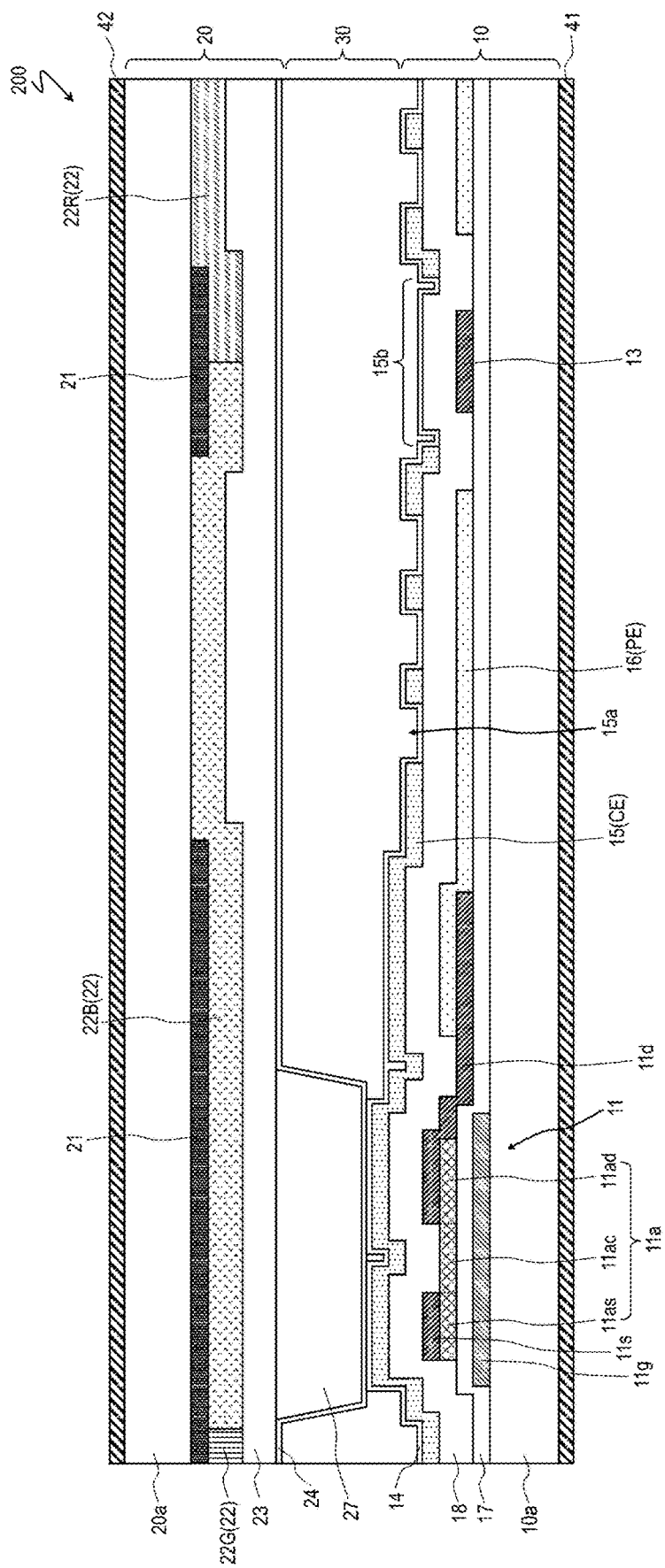
FIG. 13 is a cross-sectional view schematically illustrating the liquid crystal display device 200 and illustrates a cross section along the line 13A-13A' in FIG. 12.

A liquid crystal display device 200 according to the present embodiment will be described with reference to FIGS. 12 and 13. FIG. 12 is a plan view schematically illustrating the liquid crystal display device 200. FIG. 13 is a cross-sectional view schematically illustrating the liquid crystal display device 200 and illustrates a cross section along the line 13A-13A' in FIG. 12. The following description will primarily focus on differences between the liquid crystal display device 200 and the liquid crystal display device 100 of the first embodiment.

The liquid crystal display device 200 is different from the liquid crystal display device 100 according to the first embodiment in that the common electrode CE (the first electrode 15) includes a plurality of openings 15b formed in regions located over the plurality of source wiring lines 13 in a plan view.

Each of the plurality of openings 15b extends so as to be located over the first part 13a and the second part 13b of the source wiring line 13 (that is, has a shape bent at a position corresponding to the boundary BD between the first region R1 and the second region R2), in a region excluding the vicinity of the TFT 11 of each pixel. The plurality of openings 15b are arranged at intervals approximately corresponding to the size of the TFT 11 along the pixel longitudinal direction DL, and the source wiring lines 13 do not covered by the common electrode CE except in the vicinity of the TFT 11.

In the liquid crystal display device 200 according to the present embodiment, since the common electrode CE includes the openings 15b as described above, the capacitance between the source wiring line 13 and the common electrode CE is reduced. Therefore, the load on the source wiring line 13 can be reduced. As a result, charging performance is enhanced, signal delay is shortened, and the display quality is improved.

If the opening 15b is provided so as to be continuously extend through a plurality of pixels or all pixels arranged in the pixel longitudinal direction DL, the capacitance between the source wiring lines 13 and the common electrode CE is further reduced, but display defect may occur due to the display region having multiple regions having different common voltages of the common electrode CE. Therefore, it may be preferable that the openings 15b be not continuous. In addition, around the sides of the opening 15b that face each other in the pixel longitudinal direction DL, the electrical field generated by the potential of the source wiring line 13 may cause the liquid crystal molecules 31 to align in an unintended direction, which may lower the display quality. Therefore, the sides of the opening 15b facing each other in the pixel longitudinal direction DL, that is, a region where the opening 15b is not formed is preferably located in a region that contributes little to display. In the present embodiment, the region in which the opening 15b is not formed is located in the vicinity of the TFT 11, that is, so as to be covered by a light blocking film disposed correspondingly to the columnar spacer 27 and the channel region 11ac of the TFT 11. This suppresses an increase in the variation in the common voltage while maintaining the display quality.

Figure 14:
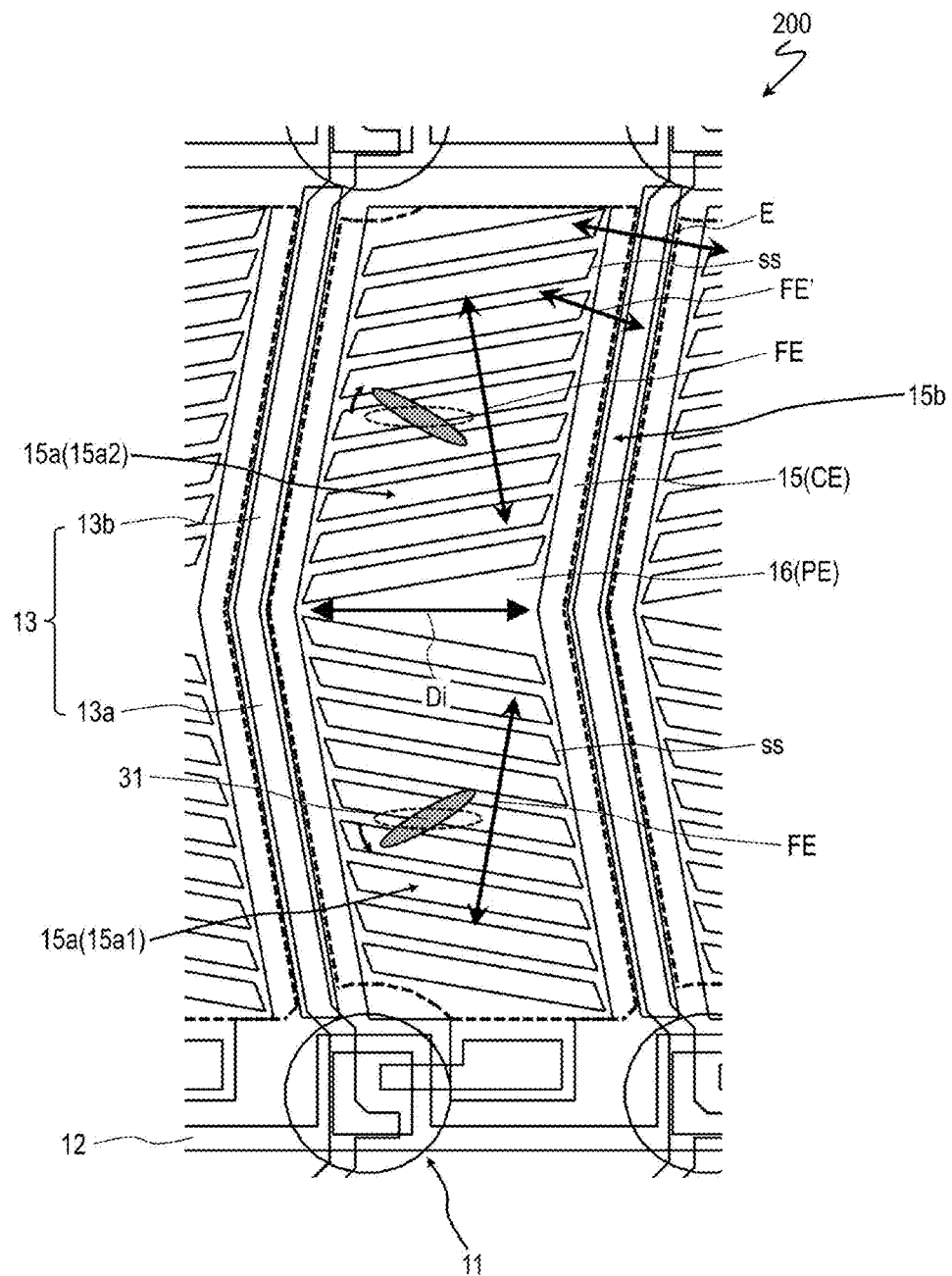

When the common electrode CE includes the opening 15b as described above, the source wiring lines 13 are not electrically shielded by the common electrode CE, and thus during the period in which a display signal is held in the pixel, the electrical field generated by the potential of the source wiring line 13 may cause the liquid crystal molecules 31 to align in an unintended direction, which may lower the display quality. However, in the present embodiment, as illustrated in FIG. 14, the direction of an electrical field E generated by the potential of the source wiring line 13 is substantially orthogonal to the direction of the fringe electrical field FE generated by the pixel electrode PE and the common electrode CE (in other words, the direction of the electrical field E is substantially parallel to the direction of a fringe electrical field FE' generated in the vicinity of the short side ss of the slit 15a). Thus, in the present embodiment, lowering of display quality (light leakage) caused by the potential of the source wiring line 13 is suppressed.

As described above, if there is a region where the direction in which the source wiring line 13 extends and the direction in which the slit 15a adjacent to the source wiring line 13 extends are substantially parallel to each other, such a region tends to have an alignment defect. Such an alignment defect tends to be significant in a configuration in which the source wiring line 13 is not electrically shielded by the common electrode CE. However, in the present embodiment, there is substantially no region in which the direction in which the source wiring line 13 extends and the direction in which the slit 15a adjacent to the source wiring line 13 extends are substantially parallel to each other, and thus the occurrence of such an alignment defect is suppressed.

Also in the present embodiment, the short side ss of the first slit 15a1 is slightly inclined with respect to the first direction D1 (more specifically, forms an angle of 5° or more and 30° or less with the first direction D1), and the short side ss of the second slit 15a2 is slightly inclined with respect to the second direction D2 (more specifically, forms an angle of 5° or more and 30° or less with the second direction D2). Thus, even when the source wiring lines 13 are not electrically shielded by the common electrode CE, the alignment of the liquid crystal molecules 31 in the vicinity of the short side ss of the slit 15a is less affected by the potential of the source wiring line 13.

The active matrix substrate 10 of the liquid crystal display device 200 according to the present embodiment may be manufactured by using a method similar to that for the active matrix substrate 10 of the liquid crystal display device 100 according to the first embodiment. However, in patterning a transparent conductive film to form the common electrode CE, not only the slits 15a but also the openings 15b are formed.

Third Embodiment

Figure 15:
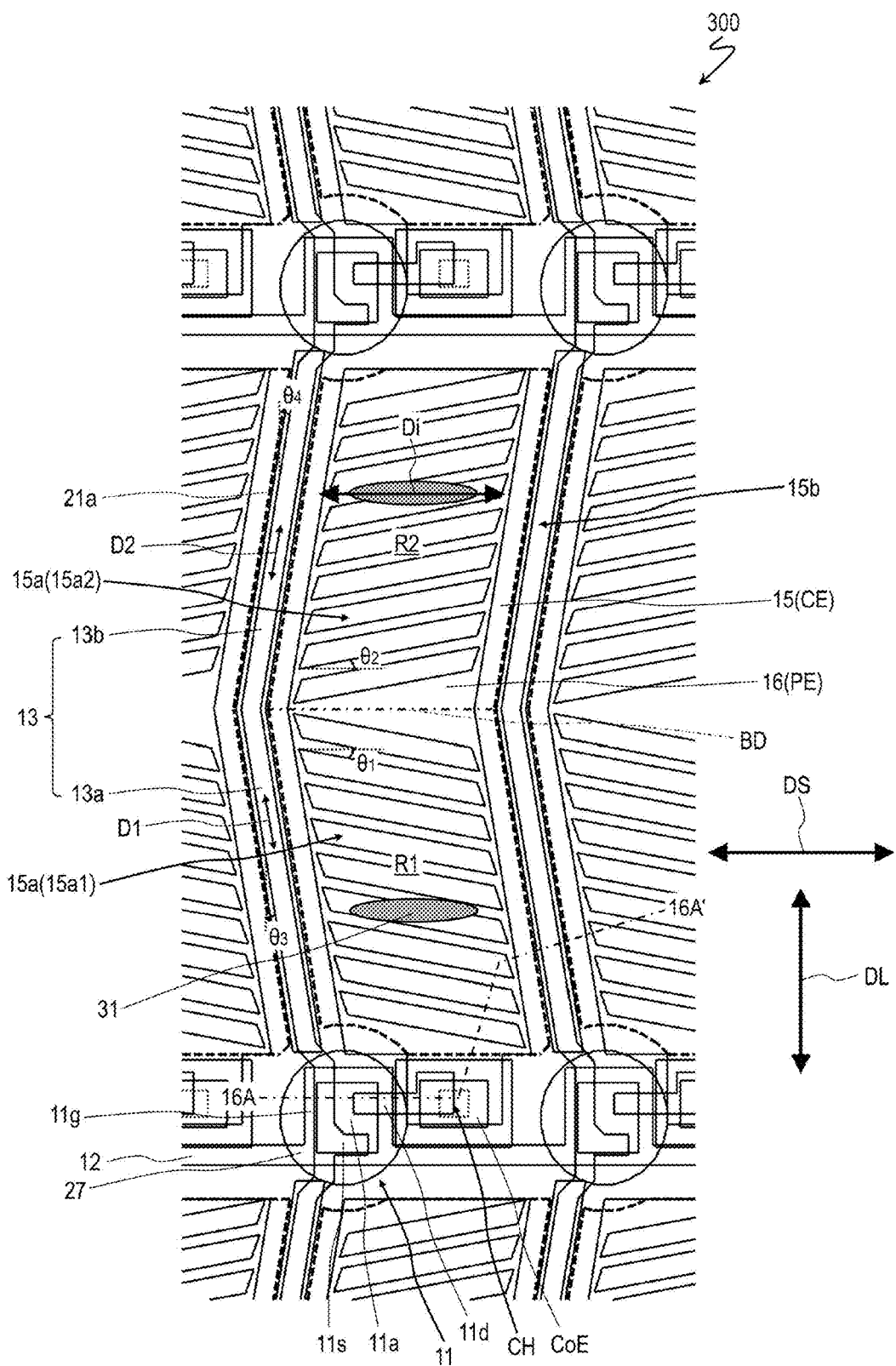
FIG. 15 is a plan view schematically illustrating still another liquid crystal display device 300 according to an embodiment of the disclosure.
Figure 16:
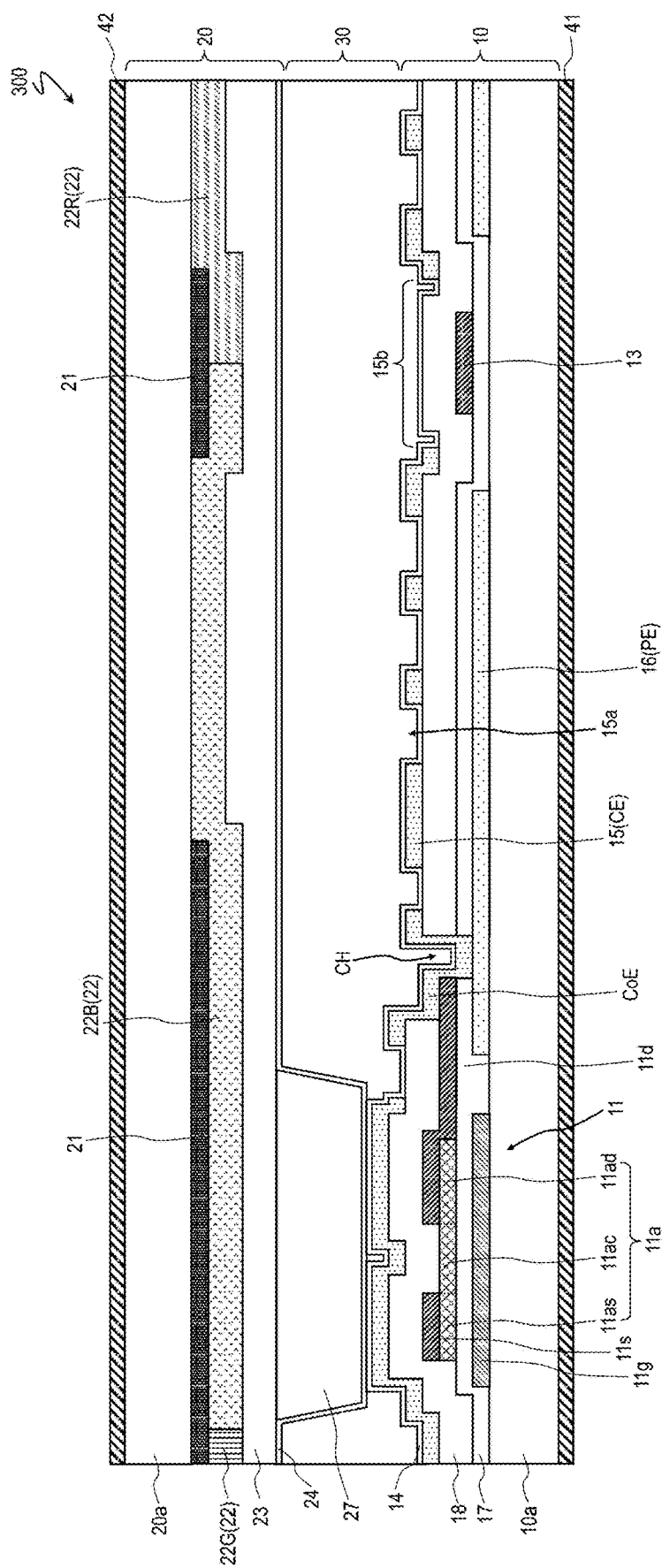
FIG. 16 is a cross-sectional view schematically illustrating the liquid crystal display device 300 and illustrates a cross section along the line 16A-16A' in FIG. 15.

A liquid crystal display device 300 according to the present embodiment will be described with reference to FIGS. 15 and 16. FIG. 15 is a plan view schematically illustrating the liquid crystal display device 300. FIG. 16 is a cross-sectional view schematically illustrating the liquid crystal display device 300 and illustrates a cross section along the line 16A-16A' in FIG. 15. The following description will primarily focus on differences between the liquid crystal display device 300 and the liquid crystal display device 200 of the second embodiment.

The liquid crystal display device 300 is different from the liquid crystal display device 200 according to the second embodiment in that the pixel electrode PE (the second electrode 16) is provided between the substrate 10a and the gate insulating layer 17 (that is, the pixel electrode PE is disposed in the lowermost layer). Since the pixel electrode PE is provided between the substrate 10a and the gate insulating layer 17, the gate insulating layer 17 and the interlayer insulating layer 18 are located between the pixel electrode PE and the common electrode CE.

The gate insulating layer 17 and the interlayer insulating layer 18 include a pixel contact hole CH that exposes a portion of the pixel electrode PE. The active matrix substrate 10 further includes a connection electrode CoE formed of the same transparent conductive film as the common electrode CE, and the drain electrode 11d of the TFT 11 and the pixel electrode PE are electrically connected to each other via the connection electrode CoE at the pixel contact hole CH.

Figure 17:
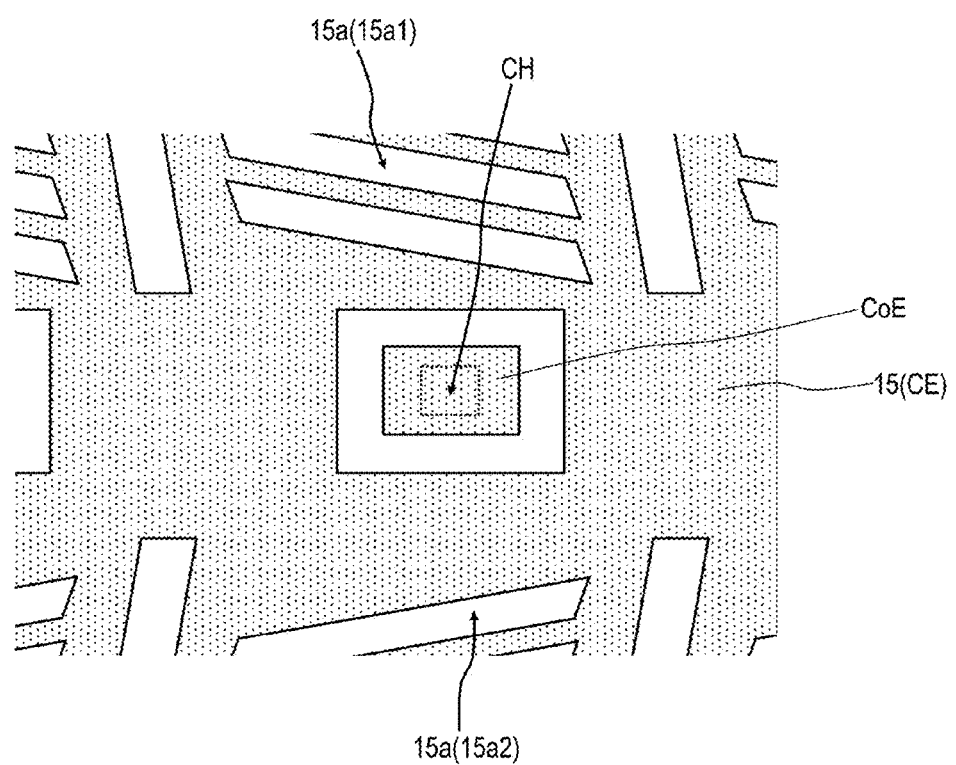
FIG. 17 is a diagram illustrating the common electrode CE and a connection electrode CoE in the vicinity of a pixel contact hole CH.

FIG. 17 is a diagram illustrating the common electrode CE and the connection electrode CoE in the vicinity of the pixel contact hole CH. The common electrode CE and the connection electrode CoE need to be electrically isolated from each other. Thus, a predetermined gap is present between the common electrode CE and the connection electrode CoE, as illustrated in FIG. 17.

In the liquid crystal display device 300 according to the present embodiment, the gate insulating layer 17 and the interlayer insulating layer 18 are located between the pixel electrode PE and the common electrode CE, and thus it is easy to increase the interelectrode distance between the pixel electrode PE and the common electrode CE, and the pixel capacitance can be reduced as compared with the liquid crystal display device 200 according to the second embodiment. Therefore, it is easy to sufficiently charge the pixel, and thus the display quality can be improved. Further, the size of the TFT 11 can be reduced to improve the aperture ratio.

The active matrix substrate 10 of the liquid crystal display device 300 according to the present embodiment may be manufactured by using substantially the same method as the active matrix substrate 10 of the liquid crystal display device 200 according to the second embodiment. However, the process of forming the pixel electrode PE is performed between the process of forming the gate electrode 11g and the like and the process of forming the gate insulating layer 17. In addition, the pixel contact hole CH is formed in the display region in a process of forming the contact hole after forming the interlayer insulating layer 18, and the connection electrode CoE is formed in the process of forming the common electrode CE. Note that the process of forming the pixel electrode PE may be performed before the process of forming the gate electrode 11g and the like. Further, patterning of a conductive film for forming the gate electrode 11g and the gate wiring line 12 and patterning of a transparent conductive film for forming the pixel electrode PE may be performed at a time using a halftone mask. In this case, the gate electrode 11g and the gate wiring lines 12 have a layered structure including a lower layer formed of the same conductive film as the transparent conductive film for forming the pixel electrode PE. This makes it possible to simplify the manufacturing process and thus achieve cost reduction.

Fourth Embodiment

Figure 18:
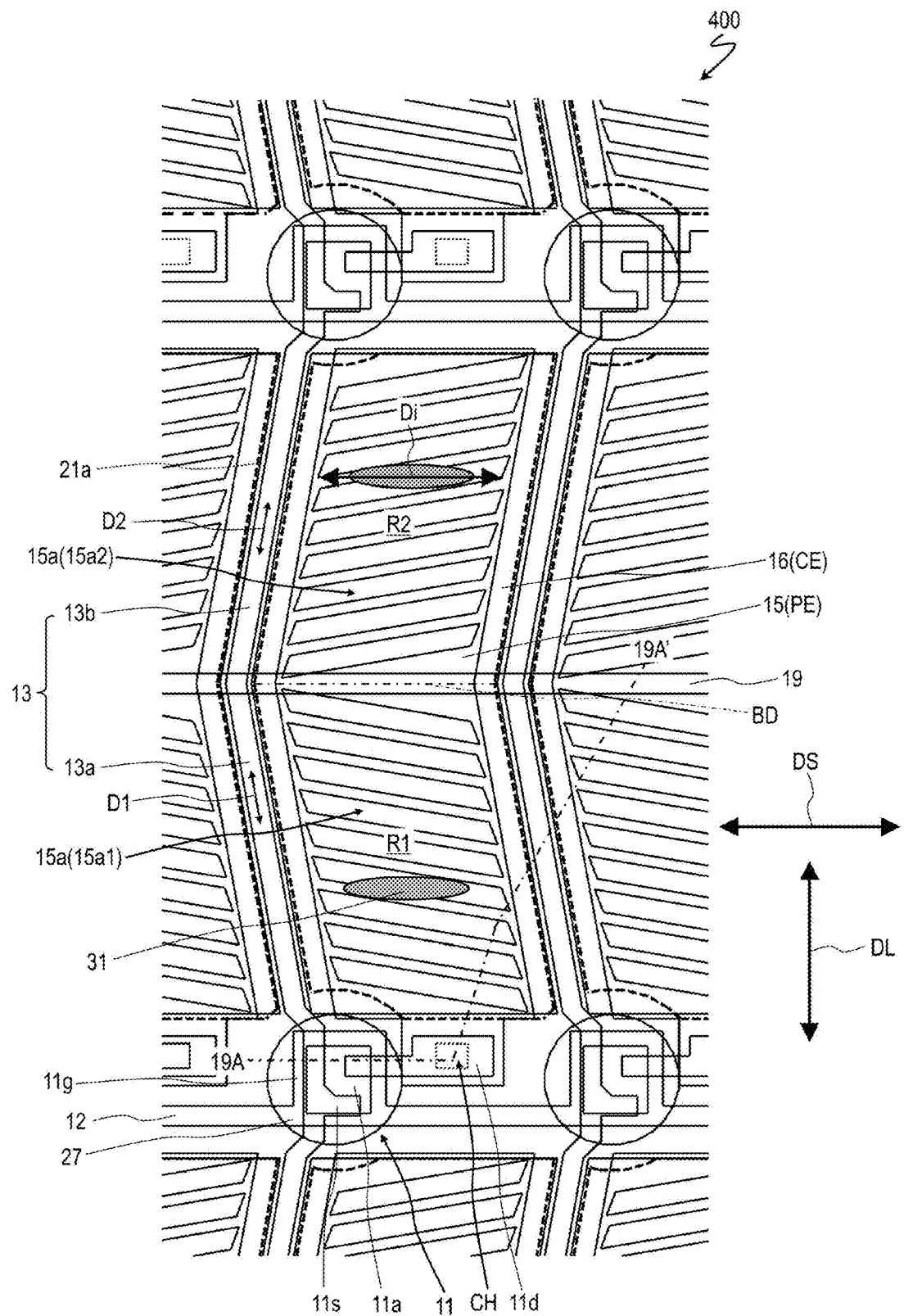
FIG. 18 is a plan view schematically illustrating yet another liquid crystal display device 400 according to an embodiment of the disclosure.
Figure 19:
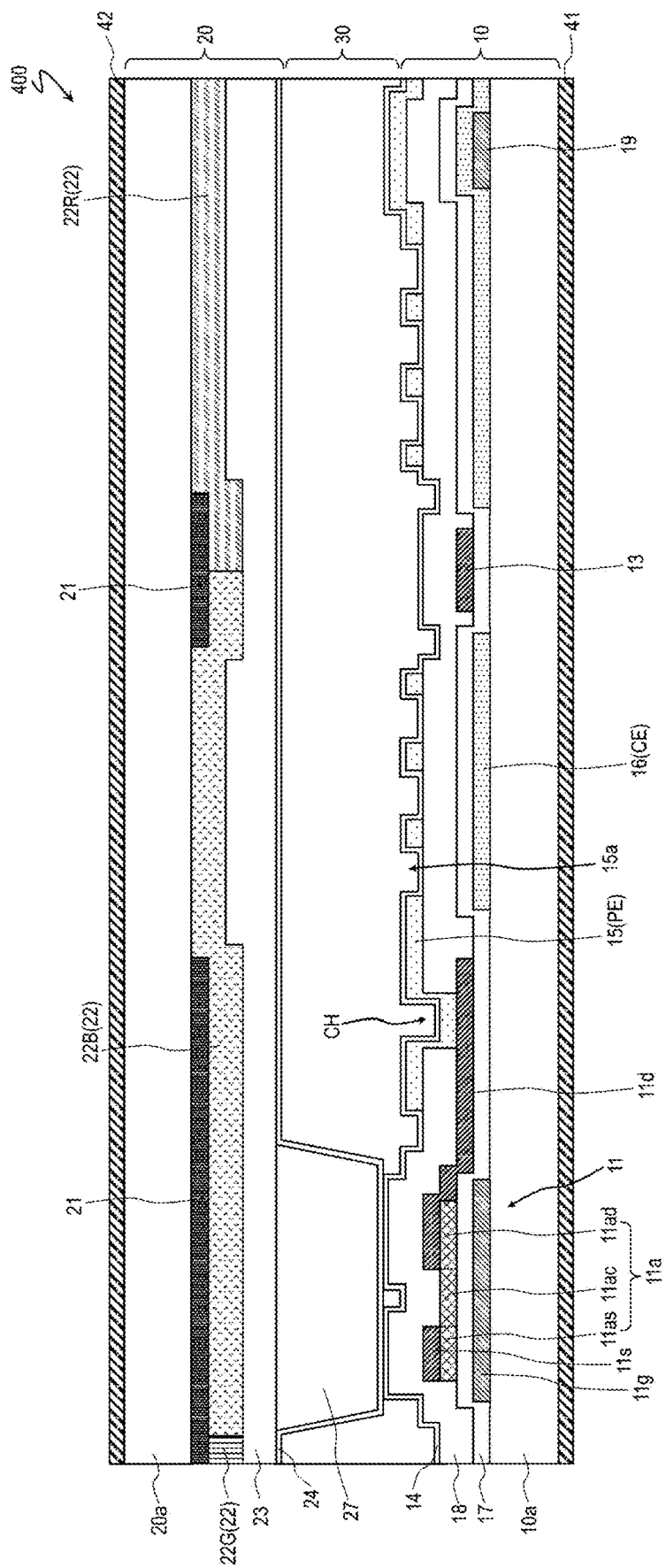
FIG. 19 is a cross-sectional view schematically illustrating the liquid crystal display device 400 and illustrates a cross section along the line 19A-19A' in FIG. 18.

A liquid crystal display device 400 according to the present embodiment will be described with reference to FIGS. 18 and 19. FIG. 18 is a plan view schematically illustrating the liquid crystal display device 400. FIG. 19 is a cross-sectional view schematically illustrating the liquid crystal display device 400 and illustrates a cross section along the line 19A-19A' in FIG. 18. The following description will primarily focus on differences between the liquid crystal display device 400 and the liquid crystal display device 100 of the first embodiment.

The liquid crystal display device 400 is different from the liquid crystal display device 100 according to the first embodiment in that the first electrode 15 is the pixel electrode PE and the second electrode 16 is the common electrode CE, that is, the pixel electrode PE is provided on the common electrode CE with at least one insulating layer interposed therebetween, and the pixel electrode PE includes the plurality of slits 15*a*.

The common electrode CE is provided between the substrate 10*a* and the gate insulating layer 17 (i.e., the common electrode CE is disposed in the lowermost layer). Therefore, the gate insulating layer 17 and the interlayer insulating layer 18 are located between the pixel electrode PE and the common electrode CE.

In the illustrated example, the common electrode CE is formed for each pixel, and a plurality of common electrodes CE in the display region are not integrally formed. The active matrix substrate 10 includes a plurality of common wiring lines 19 each extending substantially parallel to the row direction, and each of the plurality of common wiring lines 19 is electrically connected to the common electrodes CE of the plurality of pixels arranged in each pixel row. That is, the plurality of common electrodes CE of each pixel row are electrically connected to each other via the common wiring lines 19, and the common electrode CE of each pixel is supplied with a common voltage from the corresponding common wiring line 19. The common wiring line 19 and the gate wiring line 12 can be formed from the same conductive film (that is, the common wiring line 19 is in the same layer as the gate wiring line 12). With such a configuration, the capacitance between the source wiring line 13 and the common electrode CE is reduced as compared with the liquid crystal display device 100 according to the first embodiment. In each pixel, the pixel electrode PE includes the first region R1 in which the first slits 15*a*1 are formed, and the second region R2 in which the second slits 15*a*2 are formed, and the common wiring line 19 is disposed at a position corresponding to the boundary BD between the first region R1 and the second region R2 of the pixel electrode PE.

Figure 20:
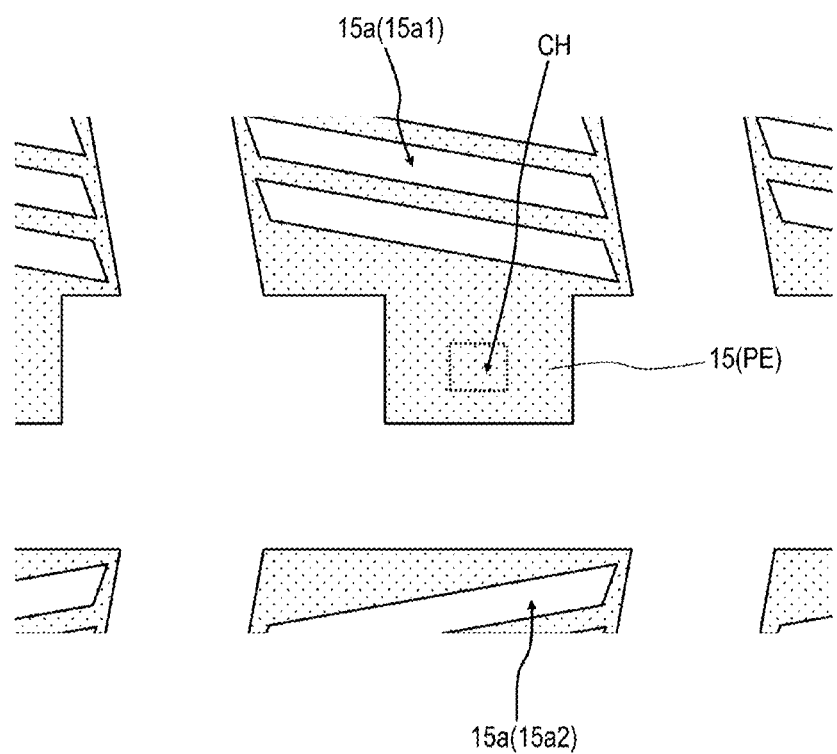
FIG. 20 is a diagram illustrating the pixel electrode PE in the vicinity of the pixel contact hole CH.

The interlayer insulating layer 18 includes the pixel contact hole CH that exposes a portion of the drain electrode 11*d* of the TFT 11. FIG. 20 is a diagram illustrating the pixel electrode PE in the vicinity of the pixel contact hole CH. The drain electrode 11*d* of the TFT 11 and the pixel electrode PE are electrically connected at the pixel contact hole CH.

In the liquid crystal display device 400 according to the present embodiment, the gate insulating layer 17 and the interlayer insulating layer 18 are located between the pixel electrode PE and the common electrode CE, and thus it is easy to increase the interelectrode distance between the pixel electrode PE and the common electrode CE, and the pixel capacitance can be reduced as compared with the liquid crystal display device 100 according to the first embodiment. Therefore, it is easy to sufficiently charge the pixel, and thus the display quality can be improved. Further, the size of the TFT 11 can be reduced to improve the aperture ratio.

The active matrix substrate 10 of the liquid crystal display device 400 according to the present embodiment may be manufactured by using substantially the same method as the active matrix substrate 10 of the liquid crystal display device 100 according to the first embodiment. However, the process of forming the common electrode CE is performed between the process of forming the gate electrode 11*g* and the like and the process of forming the gate insulating layer 17, and the process of forming the pixel electrode PE is performed after the process of forming the contact hole in the interlayer insulating layer 18. In addition, the common wiring line 19 is formed in the process of forming the gate electrode 11*g* and the like, and in the process of forming a contact hole in the interlayer insulating layer 18, the pixel contact hole CH is formed in the display region. Note that the process of forming the common electrode CE may be performed before the process of forming the gate electrode 11*g* and the like. Further, patterning of a conductive film for forming the gate electrode 11*g* and the gate wiring line 12 and patterning of a transparent conductive film for forming the common electrode CE may be performed at a time using a halftone mask. In this case, the gate electrode 11*g*, the gate wiring lines 12, and the common wiring line 19 have a layered structure including a lower layer formed of the same conductive film as the transparent conductive film for forming the common electrode CE, and the plurality of common electrodes CE in each pixel row are integrally formed by using the transparent conductive film for forming the common electrodes CE. This makes it possible to simplify the manufacturing process and thus achieve cost reduction.

The common wiring line 19 may be omitted. In the case where the common wiring line 19 is omitted, a connection portion which is formed integrally with the common electrodes CE and connects the adjacent common electrodes CE may be provided below the source wiring line 13, for example. In the case where the common wiring line 19 is provided as illustrated, the common wiring line 19 can be formed from a material having a relatively low electrical resistivity to stabilize the common potential to improve the display quality.

Oxide Semiconductor TFT

For example, an oxide semiconductor TFT may be suitably used as the TFT 11 provided in each pixel. In the oxide semiconductor TFT, an oxide semiconductor is used as the active layer material. In other words, the oxide semiconductor TFT includes an oxide semiconductor layer as an active layer. In recent years, an oxide semiconductor has attracted attention as an active layer material that can be used in place of amorphous silicon and polycrystalline silicon.

The oxide semiconductor has mobility higher than that of amorphous silicon. Thus, the oxide semiconductor TFT can operate at a higher speed than an amorphous silicon TFT. Further, since the oxide semiconductor layer is formed by a process simpler than that for the amorphous silicon layer, the oxide semiconductor layer can be applied to a device that requires a large area.

Further, since the oxide semiconductor TFT has excellent off-leakage characteristics, a driving method can be used that performs display with a reduced rewriting frequency of an image. For example, when displaying a still image, the oxide semiconductor TFT can be operated so that the image data is rewritten at a frequency of once per second. Such a driving method is referred to as a pause drive or a low frequency drive, and can significantly reduce the power consumption of the liquid crystal display device.

By adopting the pause drive and performing touch detection in a period in which rewriting of an image is not performed, it is possible to suppress a decrease in the sensitivity of a touch operation due to noise from the drive circuit and to increase an S/N ratio (signal-to-noise ratio) to approximately 10 times that in the related art, for example.

In addition, since the oxide semiconductor TFT can be advantageously used to decrease the size of the TFT, a configuration in which a memory circuit is provided for each pixel (referred to as "memory in pixels (MIP)") can also be suitably realized. Since a specific configuration of an MIP is publicly known, the description thereof is omitted herein.

The oxide semiconductor included in the active layer of the oxide semiconductor TFT (oxide semiconductor layer) may be an amorphous oxide semiconductor, or may be a crystalline oxide semiconductor including a crystalline portion. Examples of the crystalline oxide semiconductor include a polycrystalline oxide semiconductor, a microcrystalline oxide semiconductor, and a crystalline oxide semiconductor having a c-axis oriented substantially perpendicular to the layer surface.

The oxide semiconductor layer may have a layered structure including two or more layers. The oxide semiconductor layer having a layered structure may include an amorphous oxide semiconductor layer and a crystalline oxide semiconductor layer, and may include a plurality of crystalline oxide semiconductor layers having different crystal structures. In addition, the oxide semiconductor layer having a layered structure may include a plurality of amorphous oxide semiconductor layers. In a case where the oxide semiconductor layer has a dual-layer structure including an upper layer and a lower layer, an energy gap of the oxide semiconductor included in the lower layer may be different from an energy gap of the oxide semiconductor included in the upper layer.

Materials, structures, and film formation methods of an amorphous oxide semiconductor and the above-described crystalline oxide semiconductors, a configuration of an oxide semiconductor layer having a layered structure, and the like are described in, for example, JP 2014-007399 A. The entire contents of the disclosure of JP 2014-007399 A are incorporated herein by reference.

The oxide semiconductor layer may include, for example, at least one metal element selected from In, Ga, and Zn. In the present embodiment, the oxide semiconductor layer includes, for example, an In—Ga—Zn—O-based semiconductor (for example, an indium gallium zinc oxide). Here, the In—Ga—Zn—O based semiconductor is a ternary oxide of indium (In), gallium (Ga), and zinc (Zn), and a ratio (composition ratio) of In, Ga, and Zn is not particularly limited. For example, the ratio includes In:Ga:Zn=2:2:1, In:Ga:Zn=1:1:1, and In:Ga:Zn=1:1:2. Such an oxide semiconductor layer 11 can be formed of an oxide semiconductor film including the In—Ga—Zn—O based semiconductor.

The In—Ga—Zn—O based semiconductor may be an amorphous semiconductor or may be a crystalline semiconductor. A crystalline In—Ga—Zn—O based semiconductor in which a c-axis is oriented substantially perpendicular to a layer surface is preferable as the crystalline In—Ga—Zn—O based semiconductor.

Note that a crystal structure of the crystalline In—Ga—Zn—O based semiconductor is disclosed in, for example, JP 2014-007399 A as described above, JP 2012-134475 A, and JP 2014-209727 A. The entire contents of the disclosure of JP 2012-134475 A and JP 2014-209727 A are incorporated herein by reference. A TFT including an In—Ga—Zn—O based semiconductor layer has a high mobility (more than 20 times as compared to an a-Si TFT) and a low leakage current (less than 1/100 as compared to the a-Si TFT). Thus, such a TFT can be suitably used as a drive TFT (for example, a TFT included in a drive circuit provided in a periphery of a display region including a plurality of pixels, and on the same substrate as the display region) and a pixel TFT (TFT provided in a pixel).

In place of the In—Ga—Zn—O-based semiconductor, the oxide semiconductor layer may include another oxide semiconductor. For example, the oxide semiconductor layer may include an In—Sn—Zn—O based semiconductor (for example, $In_2O_3$—$SnO_2$—ZnO; InSnZnO). The In—Sn—Zn—O based semiconductor is a ternary oxide of indium (In), tin (Sn), and zinc (Zn).

Alternatively, the oxide semiconductor layer 11 may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, and an In—Ga—Zn—Sn—O based semiconductor.

INDUSTRIAL APPLICABILITY

The embodiments of the disclosure can further increase the aperture ratio of an FFS mode liquid crystal display device.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A liquid crystal display device comprising:
   an active matrix substrate;
   a counter substrate facing the active matrix substrate;
   a liquid crystal layer provided between the active matrix substrate and the counter substrate; and
   a plurality of pixels arranged in a matrix including a plurality of rows and a plurality of columns,
   wherein the active matrix substrate includes:
      a substrate,
      a thin film transistor provided correspondingly to each of the plurality of pixels and supported by the substrate,
      a plurality of gate wiring lines, each extending in a row direction,
      a plurality of source wiring lines, each extending in a direction intersecting the row direction,
      an alignment film configured to determine an initial alignment direction, the initial alignment direction being an alignment direction of liquid crystal molecules when an electrical field is not applied to the liquid crystal layer, and
      a first electrode and a second electrode, both of which are configured to generate a fringe electrical field causing the liquid crystal molecules to align in a direction different from the initial alignment direction,
   the first electrode includes a plurality of slits and is provided on the second electrode with at least one insulating layer interposed between the first electrode and the second electrode,
   each of the plurality of pixels has a shape having a pixel short-hand direction defined in the row direction, and a pixel longitudinal direction defined in a column direction,
   each of the plurality of slits of the first electrode extends and forms an acute angle with the pixel short-hand direction smaller than an acute angle formed by each of the plurality of slits and the pixel longitudinal direction, the plurality of slits includes:
a plurality of first slits, each extending and forming an acute angle in a clockwise direction with respect to the pixel short-hand direction, and
a plurality of second slits, each extending and forming an acute angle in a counterclockwise direction with respect to the pixel short-hand direction,
the first electrode includes:
a first region in which the plurality of first slits is formed, and
a second region in which the plurality of second slits is formed, the second region being adjacent to the first region along the pixel longitudinal direction,
in a plan view, each of the plurality of source wiring lines is bent at a position corresponding to a boundary between the first region and the second region of the first electrode,
an outer edge of each of the plurality of slits includes a pair of long sides and a pair of short sides,
the pair of short sides is respectively located at both ends of each of the plurality of slits in the pixel short-hand direction,
each of the plurality of source wiring lines includes:
a first part adjacent to the first region of the first electrode, and
a second part adjacent to the second region of the first electrode,
the first part extends in a first direction inclined at an acute angle with the pixel longitudinal direction,
the second part extends in a second direction inclined at an acute angle with the pixel longitudinal direction, the second direction being different from the first direction,
each of the pair of short sides included in each of the plurality of first slits extends in a direction that is inclined at an acute angle with the pixel longitudinal direction and is inclined to the same side as the first direction with respect to the pixel longitudinal direction, and
each of the pair of short sides included in each of the plurality of second slits extends in a direction that is inclined at an acute angle with the pixel longitudinal direction and is inclined to the same side as the second direction with respect to the pixel longitudinal direction.

2. The liquid crystal display device according to claim 1, wherein the second electrode is a pixel electrode provided in each of the plurality of pixels and electrically connected to the thin film transistor, and
the first electrode is a common electrode to which a common voltage is applied.

3. The liquid crystal display device according to claim 2, wherein the common electrode includes a plurality of openings formed in regions located over the plurality of source wiring lines in the plan view.

4. The liquid crystal display device according to claim 3, wherein each of the plurality of openings is bent at the position corresponding to the boundary between the first region and the second region of the first electrode.

5. The liquid crystal display device according to claim 2, wherein the thin film transistor includes a semiconductor layer, a gate electrode, a source electrode, and a drain electrode, and has a bottom gate structure in which the gate electrode is disposed between the substrate and the semiconductor layer,
the active matrix substrate further includes:
a gate insulating layer formed to cover the gate electrode, and
an interlayer insulating layer formed to cover the thin film transistor,
the pixel electrode is provided between the substrate and the gate insulating layer, and
the at least one insulating layer located between the pixel electrode and the common electrode includes the gate insulating layer and the interlayer insulating layer.

6. The liquid crystal display device according to claim 5, wherein the gate insulating layer and the interlayer insulating layer include a pixel contact hole exposing a portion of the pixel electrode,
the active matrix substrate further includes a connection electrode, and the connection electrode and the common electrode are formed using the same transparent conductive film, and
the drain electrode of the thin film transistor and the pixel electrode are electrically connected to each other via the connection electrode at the pixel contact hole.

7. The liquid crystal display device according to claim 1, wherein the first electrode is a pixel electrode provided in each of the plurality of pixels and electrically connected to the thin film transistor, and
the second electrode is a common electrode to which a common voltage is applied.

8. The liquid crystal display device according to claim 7, wherein the active matrix substrate further includes a common wiring line extending in substantially parallel to the row direction, and
the common wiring line is electrically connected to the common electrode.

9. The liquid crystal display device according to claim 8, wherein the common wiring line and the plurality of gate wiring lines are formed using the same conductive film.

10. The liquid crystal display device according to claim 8, wherein the common wiring line is disposed at the position corresponding to the boundary between the first region and the second region of the first electrode.

11. The liquid crystal display device according to claim 7, wherein the thin film transistor includes a semiconductor layer, a gate electrode, a source electrode, and a drain electrode, and has a bottom gate structure in which the gate electrode is disposed between the substrate and the semiconductor layer,
the active matrix substrate further includes:
a gate insulating layer formed to cover the gate electrode, and
an interlayer insulating layer formed to cover the thin film transistor,
the common electrode is provided between the substrate and the gate insulating layer, and
the at least one insulating layer located between the pixel electrode and the common electrode includes the gate insulating layer and the interlayer insulating layer.

12. The liquid crystal display device according to claim 1, wherein each of the pair of short sides included in the outer edge of each of the plurality of first slits forms an angle of 5° or more and 30° or less with the first direction,
each of the pair of short sides included in the outer edge of each of the plurality of second slits forms an angle of 5° or more and 30° or less with the second direction,
in a part of the liquid crystal layer corresponding to the first region, a direction of the fringe electrical field is orthogonal to the direction in which each of the pair of short sides included in each of the plurality of first slits extends, and the fringe electrical field rotates the liquid crystal molecules in the counterclockwise direction in the plan view, and in a part of the liquid crystal layer corresponding to the second region, a direction of the fringe electrical field is orthogonal to the direction in which each of the pair of short sides included in each of the plurality of second slits extends, and the fringe electrical field rotates the liquid crystal molecules in the clockwise direction in the plan view.

13. The liquid crystal display device according to claim 12, wherein each of the plurality of slits is bent at or in a vicinity of the both ends of each of the plurality of slits.

14. The liquid crystal display device according to claim 1, wherein the initial alignment direction determined by the alignment film is substantially parallel to the row direction.

\* \* \* \* \*